(12) United States Patent
Sasaki

(10) Patent No.: US 11,292,406 B2
(45) Date of Patent: Apr. 5, 2022

(54) INFORMATION PROCESSING SYSTEM AND INFORMATION PROCESSING PROGRAM

(71) Applicant: TOYOTA JIDOSHA KABUSHIKI KAISHA, Toyota (JP)

(72) Inventor: Akira Sasaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/789,649

(22) Filed: Feb. 13, 2020

(65) Prior Publication Data

US 2020/0290536 A1 Sep. 17, 2020

(30) Foreign Application Priority Data

Mar. 11, 2019 (JP) .............................. JP2019-043878

(51) Int. Cl.
*B60R 16/037* (2006.01)
*G01C 21/36* (2006.01)
*G06F 3/04847* (2022.01)

(52) U.S. Cl.
CPC ........ *B60R 16/037* (2013.01); *G01C 21/3626* (2013.01); *G06F 3/04847* (2013.01)

(58) Field of Classification Search
CPC .............. B60R 16/037; G01C 21/3626; G06F 3/04847
See application file for complete search history.

(56) References Cited

U.S. PATENT DOCUMENTS

| | | | | |
|---|---|---|---|---|
| 8,190,324 B2 * | 5/2012 | Hattori | ............... | G07C 9/00563 701/36 |
| 8,498,773 B2 * | 7/2013 | Marur | .................. | B60G 17/021 701/31.4 |
| 9,630,555 B1 * | 4/2017 | Prakah-Asante | ...... | B60K 31/18 |
| 2004/0019591 A1 * | 1/2004 | Gardner | .................. | G06F 16/20 |
| 2007/0299577 A1 * | 12/2007 | Hattori | ............... | G07C 9/00563 701/29.6 |
| 2010/0299017 A1 * | 11/2010 | Hansen | .................. | G06F 16/252 701/31.4 |
| 2011/0119614 A1 * | 5/2011 | Powell | .................. | G06F 16/435 715/771 |
| 2014/0136013 A1 * | 5/2014 | Wolverton | ............. | B60K 35/00 701/1 |
| 2018/0043903 A1 * | 2/2018 | Hosey | ............... | B60W 50/0098 |

(Continued)

FOREIGN PATENT DOCUMENTS

JP 2008-072160 A 3/2008
JP 2008-195231 A 8/2008

*Primary Examiner* — Andrea N Long
(74) *Attorney, Agent, or Firm* — Oliff PLC

(57) ABSTRACT

An information processing system includes: an identifier management unit that manages a first identifier, a second identifier, and a third identifier by which a first vehicle, a second vehicle, and a user to switch from the first vehicle to the second vehicle are uniquely identified, respectively; a specification difference pinpointing unit that compares specification of a first operation unit and specification of a second operation unit, and that pinpoints an operation unit for which a specification of a function is common and a specification of the operation unit is different before and after the switching from the first vehicle to the second vehicle; and an assist information providing unit that provides assist information by which an operation of the pinpointed operation unit is assisted.

7 Claims, 22 Drawing Sheets

(56) References Cited

U.S. PATENT DOCUMENTS

| | | | |
|---|---|---|---|
| 2018/0170256 A1* | 6/2018 | Medenica | B60R 16/037 |
| 2020/0047767 A1* | 2/2020 | Boss | G06F 3/04847 |
| 2020/0070849 A1* | 3/2020 | Suzuki | B60W 50/087 |
| 2020/0073527 A1* | 3/2020 | Bandishti | G06F 3/0346 |

* cited by examiner

FIG. 3

| USER INFORMATION | | | | 131 |
|---|---|---|---|---|
| USER | ID | PASSWORD | VEHICLE TYPE OF PRIVATE CAR | |
| AAA | abcde | 012a | α | |
| BBB | fghij | 34b5a | α | |
| CCC | klmnop | 678cde | β | |
| DDD | qrstuv | 9012zz | NO | |
| ... | ... | ... | ... | |

FIG. 4

| RESERVATION INFORMATION ABOUT VEHICLE A (VEHICLE TYPE α) | | | | | 132 |
|---|---|---|---|---|---|
| RENTAL DATE AND HOUR | RENTAL PLACE | RETURN DATE AND HOUR | RETURN PLACE | USER | |
| 2010.8.1 12:00 | A SERVICE OFFICE | 2010.8.1 18:00 | B SERVICE OFFICE | AAA | |
| 2010.8.2 10:00 | B SERVICE OFFICE | 2010.8.3 15:00 | C SERVICE OFFICE | BBB | |
| 2010.8.3 18:00 | C SERVICE OFFICE | 2010.8.4 12:00 | A SERVICE OFFICE | CCC | |
| 2010.8.4 15:00 | A SERVICE OFFICE | 2010.8.4 21:00 | A SERVICE OFFICE | DDD | |
| ... | ... | ... | ... | ... | |

FIG. 5

| USE HISTORY INFORMATION ABOUT USER AAA | | | 133 |
|---|---|---|---|
| VEHICLE TYPE | START DATE AND HOUR | END DATE AND HOUR | |
| γ | 2010.4.1 12:00 | 2010.4.1 18:00 | |
| β | 2010.5.5 10:00 | 2010.5.5 15:00 | |
| β | 2010.6.3 18:00 | 2010.6.4 12:00 | |
| γ | 2010.7.8 15:00 | 2010.7.8 21:00 | |
| ... | ... | ... | |

FIG. 6A

| SPECIFICATION OF FUNCTION | (VEHICLE TYPE α) VEHICLE TYPE-CLASSIFIED OPERATION METHOD INFORMATION (SPECIFICATION INFORMATION) | | |
|---|---|---|---|
| | VEHICLE TYPE α, OPERATION METHOD | | |
| | MODEL YEAR H25 | MODEL YEAR H26 | MODEL YEAR H27 |
| FUNCTION 1 (MAP SCALE ADJUSTMENT) | OPERATION METHOD X1 (TURNING OF DIAL SWITCH) | OPERATION METHOD X1 (TURNING OF DIAL SWITCH) | OPERATION METHOD X2 (PINCH OPERATION OF TOUCH PANEL) |
| FUNCTION 2 (SOUND VOLUME ADJUSTMENT) | OPERATION METHOD Y1 (TURNING OF DIAL SWITCH) | OPERATION METHOD Y1 (TURNING OF DIAL SWITCH) | OPERATION METHOD Y2 (BUTTON OPERATION OF TOUCH PANEL) |
| FUNCTION 3 (ACTUATION OR RELEASE OF PARKING BRAKE) | OPERATION METHOD Z1 (OPERATION OF LEVER-TYPE HANDBRAKE) | OPERATION METHOD Z1 (OPERATION OF LEVER-TYPE HANDBRAKE) | OPERATION METHOD Z2 (OPERATION OF SWITCH-TYPE HANDBRAKE) |
| FUNCTION 4 (ACTIVATION, RELEASE OR ADJUSTMENT OF CRUISE CONTROL) | OPERATION METHOD A1 (OPERATION OF LEVER-TYPE SWITCH) | OPERATION METHOD A1 (OPERATION OF LEVER-TYPE SWITCH) | OPERATION METHOD A2 (OPERATION OF BUTTON-TYPE SWITCH) |

134

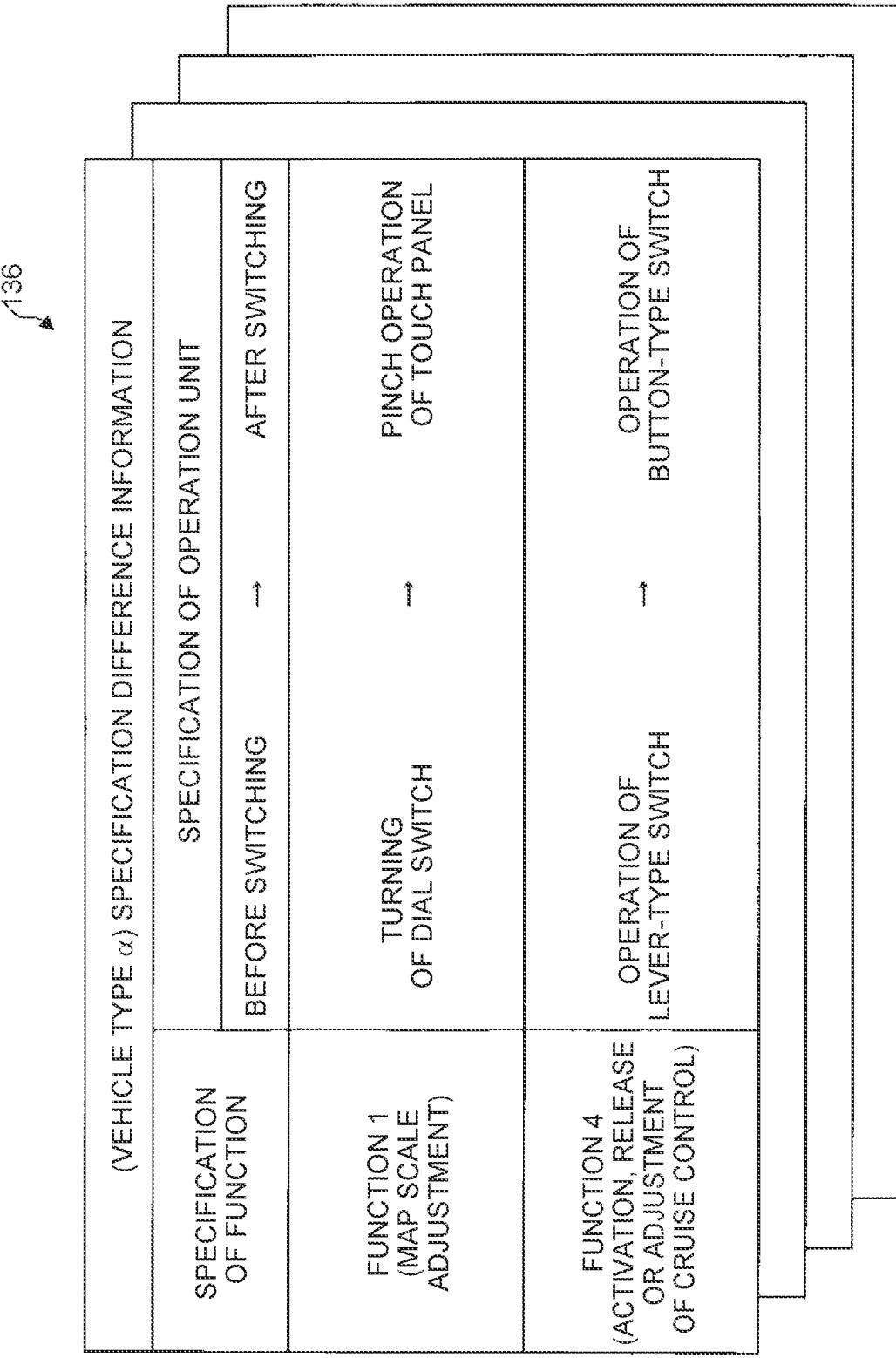

FIG. 6D

| GUIDANCE A: | "METHOD FOR ADJUSTING SCALE OF MAP: PERFORM OPERATION OF DIAL SWITCH BEFORE SWITCHING, AND PERFORM PINCH OPERATION ON SCREEN AFTER SWITCHING," |
|---|---|
| GUIDANCE B: | "METHOD FOR SETTING CRUISE CONTROL: PERFORM OPERATION OF LEVER-TYPE SWITCH BEHIND STEERING WHEEL BEFORE SWITCHING, AND PERFORM OPERATION OF BUTTON-TYPE SWITCH ON STEERING WHEEL AFTER SWITCHING," |

FIG. 8

| | OWN VEHICLE | VEHICLE TYPE β |
|---|---|---|
| FUNCTION 2 | OPERATION METHOD P | OPERATION METHOD Q |
| FUNCTION 3 | OPERATION METHOD S | OPERATION METHOD T |
| FUNCTION 5 | OPERATION METHOD A | OPERATION METHOD B |
| FUNCTION 8 | OPERATION METHOD J | OPERATION METHOD K |
| ... | ... | ... |

| | OPERATION METHOD | STATE |
|---|---|---|
| FUNCTION 1 | OPERATION METHOD X | STATE A |
| FUNCTION 2 | OPERATION METHOD P | STATE B |
| FUNCTION 3 | OPERATION METHOD S | STATE C |
| ... | ... | ... |

234

FIG. 13
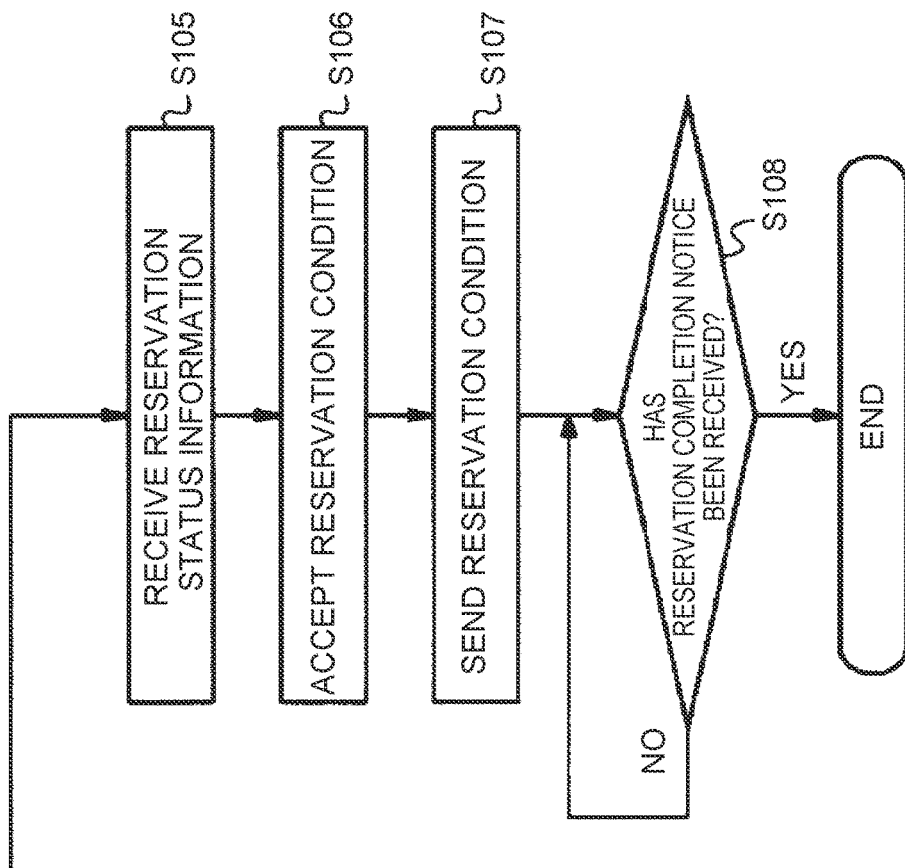
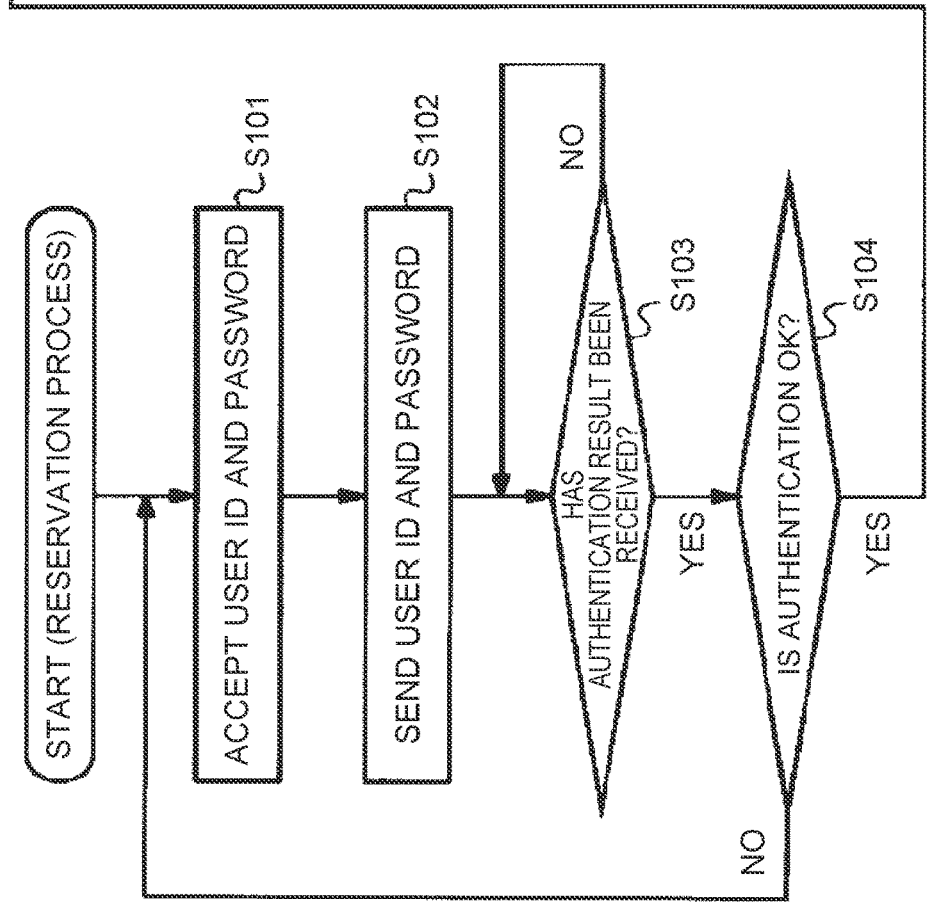

FIG. 18A

| (VEHICLE TYPE α) VEHICLE TYPE-CLASSIFIED OPERATION METHOD INFORMATION (SPECIFICATION INFORMATION) | | | |
|---|---|---|---|
| SPECIFICATION OF FUNCTION | VEHICLE TYPE α, OPERATION METHOD | | |
| | MODEL YEAR H25 | MODEL YEAR H27 | |
| FUNCTION 1 (MAP SCALE ADJUSTMENT) | OPERATION METHOD X1 (TURNING OF DIAL SWITCH) | OPERATION METHOD X1 (TURNING OF DIAL SWITCH) | ... |
| FUNCTION 5 (TRAVELING MODE ALTERATION) | NO | OPERATION METHOD X1 (TURNING OF DIAL SWITCH) | ... |
| ... | ... | ... | ... |
| ... | ... | ... | ... |

| GUIDANCE C: | "USE DIAL SWITCH TO PERFORM METHOD FOR ADJUSTING SCALE OF MAP, SIMILARLY TO CAR BEFORE SWITCHING" |
|---|---|
| GUIDANCE D: | "NEW FUNCTION TO BE SET WITH DIAL SWITCH IS ADDED. TRAVELING MODE CAN BE ALTERED USING DIAL SWITCH" |

INFORMATION PROCESSING SYSTEM AND INFORMATION PROCESSING PROGRAM

INCORPORATION BY REFERENCE

The disclosure of Japanese Patent Application No. 2019-043878 filed on Mar. 11, 2019 including the specification, drawings and abstract is incorporated herein by reference in its entirety.

BACKGROUND

1. Technical Field

The disclosure relates to an information processing system and an information processing program.

2. Description of Related Art

In a vehicle, various functions are equipped for assisting driving. Examples of the functions include a function to change the scale of a map that is displayed on a navigation screen and a function to alter a vehicle setting that is displayed on the navigation screen. Further, an operation unit such as a mechanical jog dial or dial switch is used for operating or setting these functions. The operation unit is operation acceptance means for accepting an operation by a user for operating or setting functions related to the driving. For example, by turning the mechanical jog dial, it is possible to alter the scale of the map that is displayed on the navigation screen, or to alter the volume of sound that is played back from an audio device. However, a user that handles the operation unit for the first time can be puzzled by an operation method for the operation unit. Japanese Patent Application Publication No. 2008-195231 (JP 2008-195231 A) discloses a vehicle inexperience detection device that assists a user unaccustomed to the vehicle. The vehicle inexperience detection device can detect an unaccustomed content of the operation unit by detecting an operation history of the operation unit by the user, and can perform an appropriate operation assist depending on the detected unaccustomed content.

SUMMARY

In the case of switching between vehicles, when model year (manufacture year) or grade is different, the specification of the operation unit for performing setting of a particular function is sometimes different between the vehicles before and after the switching even if vehicle type (model) is identical. For example, there is a case where in the vehicle before the switching, a mechanical dial switch for operating a navigation device is provided on a center console, but in the vehicle after the switching, the dial switch is altered to a touch-panel operation button. Further, there is a case where operation units having the same shape are provided in the vehicles before and after the switching, but functions that can be operated with the operation units are different. Therefore, a user that switches to a vehicle having a different model year and specification, even if the vehicle type is identical, needs to refer to, for example, a manual provided in the vehicle after the switching, and to check a function, an operation method or the like that is different before and after the switching. Accordingly, a long time is required before the user is accustomed to the function or operation unit that is different before and after the switching, and in addition, the user cannot focus on the driving of the vehicle, so that safety is impaired, in some cases. In the related art disclosed in JP 2008-195231 A, it is not intended to assist the operation by the user when the specification of the operation unit or function is different before and after the switching between vehicles. Therefore, there is room for improvement in provision of an environment in which the user can focus on driving even in the vehicle after the switching.

The disclosure has been made in view of the above point, and has an object to provide the environment in which the user can focus on driving.

To solve such problem, an information processing system according to an embodiment of the disclosure includes an identifier management unit that manages a first identifier, a second identifier and a third identifier, the first identifier being an identifier by which a first vehicle is uniquely identified, the first vehicle including a first operation unit with which a first function related to vehicle driving is operated, the second identifier being an identifier by which a second vehicle is uniquely identified, the second vehicle including a second operation unit with which a second function related to the vehicle driving is operated, the third identifier being an identifier by which a user is uniquely identified, the user switching from the first vehicle to the second vehicle. The information processing system includes a specification management unit that manages specification information indicating each specification of the first function, the second function, the first operation unit and the second operation unit. The information processing system includes a specification difference pinpointing unit that compares the specification of the first operation unit and the specification of the second operation unit, based on the specification information, the first identifier, the second identifier and the third identifier, and that pinpoints an operation unit for which a specification of a function is common and a specification of the operation unit is different before and after the switching from the first vehicle to the second vehicle. The information processing system includes an assist information providing unit that provides assist information based on information relevant to the pinpointed operation unit having the different specification, the assist information being information by which an operation of the pinpointed operation unit is assisted.

With the embodiment, a user that buys the same vehicle type as a replacement, or a user that uses the same vehicle type by using a car sharing service can refer to the assist information provided from the assist information providing unit, in the vehicle after the switching, and can thereby focus on the driving of the vehicle while a long time is not required before the user is accustomed to the operation unit.

In the embodiment, the specification difference pinpointing unit may pinpoint a function for which a specification of an operation unit is common and a specification of the function is different before and after the switching from the first vehicle to the second vehicle, by comparing the specification of the first function and the specification of the second function instead of the specification of the first operation unit and the specification of the second operation unit. The assist information providing unit may provide assist information based on information relevant to the pinpointed function having the different specification instead of the information relevant to the pinpointed operation unit having the different specification, the assist information being information by which an operation of the pinpointed function is assisted.

With the embodiment, the user that buys the same vehicle type as a replacement, or the user that uses the same vehicle type by using a car sharing service can refer to the assist information provided from the assist information providing unit, in the vehicle after the switching, and thereby, even if the user switches to a vehicle type having a common operation unit and having a different function, the user can focus on the driving of the vehicle while a long time is not required before the user is accustomed to setting or alteration of a desired function.

In the embodiment, the assist information providing unit may provide the assist information by which the operation of the operation unit is assisted, to a portable terminal of the user that switches from the first vehicle to the second vehicle, when a certain or higher acceleration is detected in the portable terminal.

With the embodiment, by using the acceleration that is detected in the portable terminal, it is possible to play back guidance only when an assist relevant to the operation of the operation unit is necessary. Therefore, in the case where the user determines that the assist relevant to the operation of the operation unit is unnecessary, the unnecessary information (guidance) is not played back, so that the user can focus on driving without having an uncomfortable feeling.

In the embodiment, the assist information providing unit may provide the assist information by which the operation of the function is assisted, to a portable terminal of the user that switches from the first vehicle to the second vehicle, when a certain or higher acceleration is detected in the portable terminal.

With the embodiment, it is possible to play back guidance only when an assist relevant to setting or alteration of a desired function is necessary. Therefore, in the case where the user determines that the assist relevant to the setting or alteration of the desired function is unnecessary, the unnecessary information (guidance) is not played back, so that the user can focus on driving without having an uncomfortable feeling.

Further, another embodiment of the disclosure can be realized as an information processing program.

The disclosure has an effect of providing an environment in which the user can focus on driving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing an example of a user information DB 131;

FIG. 4 is a diagram showing an example of a reservation information DB 132;

FIG. 5 is a diagram showing an example of a use history information DB 133;

FIG. 6A is a diagram showing an example of a vehicle type-classified operation method DB 134;

FIG. 6B is a diagram showing an example of a specification difference information DB 136;

FIG. 6D is a diagram for describing a specific example of guidance information shown in FIG. 6C;

FIG. 8 is a diagram showing an example of an operation method difference information DB 231;

FIG. 9 is a diagram showing an example of a function information DB 234;

FIG. 13 is a diagram showing an example of a behavior flow of the portable terminal 30 at the time of reservation;

FIG. 18A is a diagram showing a modification of the vehicle type-classified operation method DB 134;

DETAILED DESCRIPTION OF EMBODIMENTS

Hereinafter, an embodiment of the disclosure will be described with reference to the drawings.

EMBODIMENT

Figure 1:
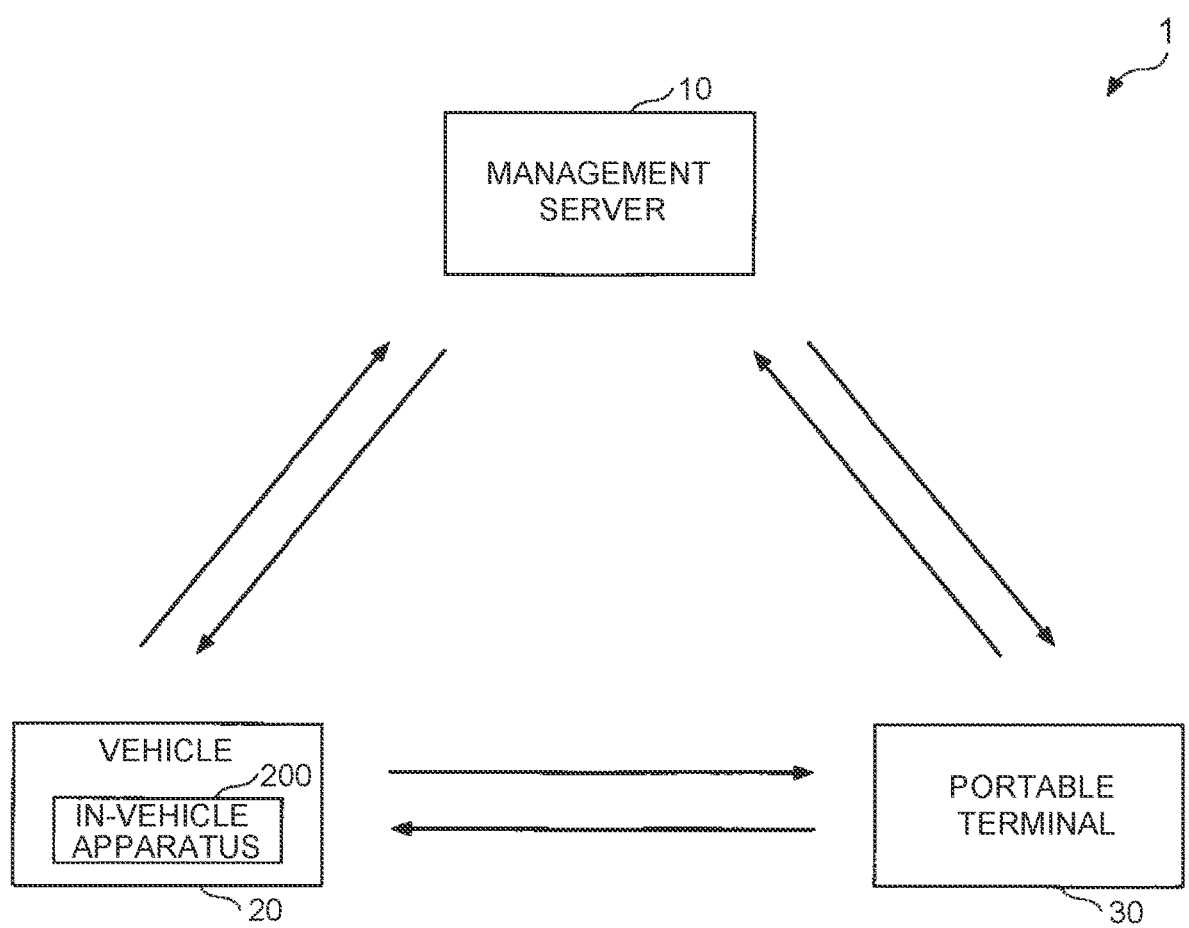
FIG. 1 is a diagram showing a configuration example of an information processing system 1 according to an embodiment of the disclosure.

FIG. 1 is a diagram showing a configuration example of an information processing system 1 according to an embodiment of the disclosure. In an example shown in the embodiment, the information processing system 1 is applied to a car sharing system. The car sharing system is a system in which a plurality of users uses a single or a plurality of vehicles 20 based on an advance reservation. In the car sharing system, the user accesses a management server 10, and reserves the vehicle 20 for use, using a portable terminal 30. When the vehicle 20 is being used by the user, an in-vehicle apparatus 200 of the vehicle 20 communicates with the management server 10 and the portable terminal 30, and thereby appropriately guides the user.

The information processing system 1 according to the embodiment is not limited to a car sharing system, and can be applied to a rental car system in which a plurality of cars is rented to unspecified users. The information processing system 1 according to the embodiment can be applied to a system in which information about vehicles 20 before and after switching is shared when a user that owns a car switches to another car. The vehicle 20 is not limited to a passenger car, and may be a freight car, an omnibus (for example, a bus) and the like. Hereinafter, the vehicle 20 is also referred to as merely a "car". For simplification of description, the embodiment will be described, assuming that the information processing system 1 is a system for car sharing.

As shown in FIG. 1, the information processing system 1 includes the management server 10, the vehicle 20 and the portable terminal 30. The management server 10, the in-vehicle apparatus 200 and the portable terminal 30 can perform wireless communication with each other.

The management server 10 manages the reservation for the vehicle 20 that is used by the user, in the information processing system 1. The management server 10 accepts the reservation for using the vehicle 20, from the user through the portable terminal 30. The management server 10 may be a server that provides various services such as an authentication key service, a trunk delivery service and a B2C car sharing service.

The vehicle 20 is used by the user that has performed the reservation in advance. The vehicle 20 is equipped with the in-vehicle apparatus 200 that can perform wireless communication with the management server 10 and the portable terminal 30.

For example, the in-vehicle apparatus 200 is a navigation device. In the case where the in-vehicle apparatus 200 is a navigation device, the in-vehicle apparatus 200 displays a map and the position of the vehicle 20 on a display device, using position information and map data from a global navigation satellite system (GNSS). The in-vehicle apparatus 200 is not limited to the navigation device, and may be an audio device, a visual device or the like, or may be a device that has both of the functions of the audio device and the visual device. In the case where the in-vehicle apparatus 200 is an audio device, the in-vehicle apparatus 200 receives a radio or television airwave, and outputs a voice or picture corresponding to the airwave. Further, the in-vehicle apparatus 200 plays back music data stored in a compact disc (CD) or a digital versatile disk (DVD), and outputs a music corresponding to the music data. Further, the in-vehicle apparatus 200 receives music data stored in the portable terminal 30, and outputs a music corresponding to the music data, from a speaker equipped in the vehicle 20.

Apparatuses equipped in the vehicle 20 include an inverter, a motor electronic control unit (ECU), a hybrid ECU, an engine ECU, a motor, auxiliaries and the like, which are not illustrated in FIG. 1. The auxiliaries include an air conditioner, a radiator fan, a rear defogger and the like. The apparatuses equipped in the vehicle 20 include various sensors. The various sensors include a voltage sensor that detects a voltage to be input from a storage battery to the inverter, a voltage sensor that detects a voltage to be input from the inverter to the motor, a speed sensor that detects a vehicle speed, an accelerator sensor that detects an accelerator operation amount, a brake sensor that detects a brake operation amount, and the like.

For example, the in-vehicle apparatus 200 includes a communication circuit that performs short-range wireless communication with the portable terminal 30 in compliance with the Bluetooth Low Energy (BLE) communication standard. The communication circuit may be communication means that can perform short-range communication with the portable terminal 30, and is not limited to the communication means complying with the BLE communication standard. For example, the communication circuit may be communication means complying with a short-range communication standard for very short communicable distances, as exemplified by Near Field Communication (NFC), ZigBee (R) and Ultra Wide Band (UWB). In this case, the communication circuit may be built at a position (for example, the interior of a door handle) near a body surface in the exterior of a vehicle cabin of the vehicle 20. Thereby, the communication circuit can communicate with the portable terminal 30 in the exterior of the vehicle cabin.

The communication circuit of the in-vehicle apparatus 200 distributes an advertising packet periodically (for example, at intervals of a few seconds), and thereby establishes a state where the communication circuit can communicate with the portable terminal 30 in compliance with a predetermined communication standard. The advertising packet includes advertising information. The advertising information includes a universally unique identifier (UUID), a device ID and the like. The UUID is an identifier (in-vehicle apparatus ID) by which the in-vehicle apparatus 200 is uniquely identified, for example, on software, and is information that is shared between the in-vehicle apparatus 200 and the portable terminal 30. For example, when a power source of the in-vehicle apparatus 200 is turned on, the communication circuit of the in-vehicle apparatus 200 sends the advertising packet that is the data including the identifier, to the portable terminal 30. The portable terminal 30 receives the advertising packet, and confirms the UUID and the like that are included in the advertising packet. Thereby, the communication circuit of the in-vehicle apparatus 200 establishes the state where the in-vehicle apparatus 200 can communicates with the portable terminal 30.

In the information processing system 1, by an operation from the user, the portable terminal 30 sends reservation information for using the vehicle 20, to the management server 10. The user is an occupant (a driver, a passenger or the like) of the vehicle 20, or the like.

For example, the portable terminal 30 is a smartphone, a portable phone, a laptop personal computer (PC), a personal digital assistant (PDA), a personal handyphone system (PHS), or the like. The portable terminal 30 communicates with the management server 10, through a predetermined communication network (for example, a portable phone network, an internet network or the like in which many base stations are used as terminals), in compliance with a wireless communication standard such as Global System for Mobile Communications (GSM (R)), Personal Digital Cellular (PDC), a Code Division Multiple Access (CDMA), Long Term Evolution (LTE) and World Wide Interoperability for Microwave Access (WiMAX). The "occupant" is a person that uses the portable terminal 30, and therefore is also referred to as the "user". The portable terminal 30 can perform short-range wireless communication with the in-vehicle apparatus 200 of the vehicle 20, in accordance with the above wireless communication standard. The short-range wireless communication includes Bluetooth (R), wireless local area network (LAN), and the like.

Figure 2:
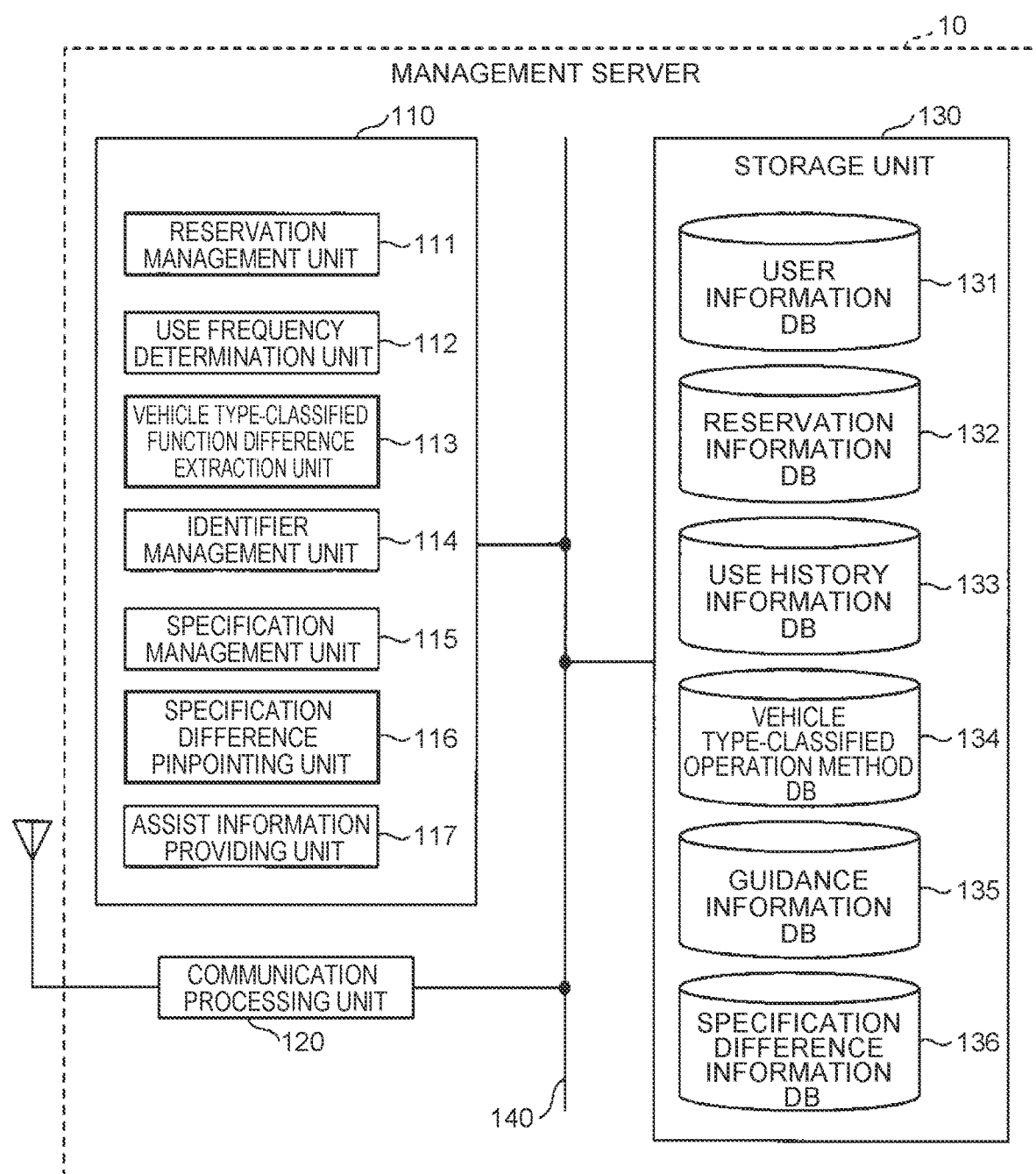
FIG. 2 is a diagram showing a configuration example of a management server 10.

FIG. 2 is a diagram showing a configuration example of the management server 10. The management server 10 includes a control unit 110, a communication processing unit 120, a storage unit 130 and a bus line 140. The control unit 110, the communication processing unit 120 and the storage unit 130 are connected through the bus line 140, so as to be able to communicate with each other.

The control unit 110 includes a reservation management unit 111, a use frequency determination unit 112, a vehicle type-classified function difference extraction unit 113, an identifier management unit 114, a specification management unit 115, a specification difference pinpointing unit 116, and an assist information providing unit 117. The control unit 110 includes a central processing unit (CPU), a read only memory (ROM), a random access memory (RAM) and an input-output interface, which are not illustrated. The CPU is a processor that controls the whole behavior of the management server 10. In the ROM, dedicated programs for realizing functions (the reservation management unit 111, the use frequency determination unit 112, the vehicle type-classified function difference extraction unit 113, the identifier management unit 114, the specification management unit 115, the specification difference pinpointing unit 116 and the assist information providing unit 117) of the management server 10 are stored. The RAM is a memory that is used as a work area for the CPU. When a power source is turned on, the CPU realizes various functions by executing the dedicated programs recorded in the ROM.

The reservation management unit 111 accepts the reservation for the use of the vehicle, from the user through the portable terminal 30.

The use frequency determination unit 112 determines the use frequency of the user for the vehicle type of a car that the user has reserved.

The vehicle type-classified function difference extraction unit 113 extracts a function that is the same and is different in operation method between the vehicle type of the car that the user has reserved and the vehicle type of a car for which the use frequency of the user is high, and an operation method for the function.

The identifier management unit 114 refers to a user information database (DB) 131 and a reservation information DB 132, and manages a first identifier, a second identifier and a third identifier, such that the first identifier, the second identifier and the third identifier are linked with each other.

The first identifier is identification information for uniquely identifying a first vehicle including a first operation unit with which a first function related to vehicle driving is operated. The first vehicle is a private car that is owned by the user. The first vehicle is a car before the switching. The first vehicle is a car that the user usually uses. For example, the first function is a function to change the scale of a map that is displayed on a navigation screen, a function to alter a vehicle setting that is displayed on the navigation screen, a function to alter the volume or quality of sound that is played back from an audio device, or the like. The first operation unit is an operation unit that accepts an operation by the user for setting the first function, and is a mechanical jog dial, a dial switch, or a sound volume control icon that is displayed on a touch-panel navigation screen, for example.

The second identifier is identification information for uniquely identifying a second vehicle including a second operation unit with which a second function related to the vehicle driving is operated. The second vehicle is a private car, a rental car, a shared car or the like to which the user switches. The second vehicle is a car after the switching. The second vehicle is a car that the user does not usually use. Similarly to the first function, for example, the second function is a function to change the scale of a map that is displayed on a navigation screen, a function to alter a vehicle setting that is displayed on the navigation screen, a function to alter the volume or quality of sound that is played back from an audio device, or the like. The second operation unit is an operation unit that accepts an operation by the user for setting the second function, and is a mechanical jog dial, a dial switch or the like, similarly to the first operation unit.

The third identifier is identification information for uniquely identifying a user that switches from the first vehicle to the second vehicle. The third identifier is identification information for uniquely identifying a user of the portable terminal 30. The third identifier is identification information for uniquely identifying a user that uses the first vehicle or the second vehicle.

Information about the first identifier, the second identifier and the third identifier linked with each other by the identifier management unit 114 is input to the specification management unit 115.

The specification management unit 115 manages each specification of the first function, the second function, the first operation unit and the second operation unit, based on the information input from the identifier management unit 114. A specific example of each specification of the first function, the second function, the first operation unit and the second operation unit will be described later. Information that is managed by the specification management unit 115 is stored in a vehicle type-classified operation method DB 134, as specification information. Details of the specification management unit 115, the specification information and the vehicle type-classified operation method DB 134 will be described later.

The specification difference pinpointing unit 116 compares the specifications of the first function and the first operation unit and the specifications of the second function and the second operation unit, based on the specification information, the first identifier, the second identifier and the third identifier, and pinpoints two operation units for which the specification of the function is common (the same) and the specification of the operation unit is different before and after the switching, as a result of the comparison. That is, the specification difference pinpointing unit 116 pinpoints operation units having a common (the same) function, from two or more operation units that are different in specification. The common (the same) function means coincidence of specifications of basic functions at an extent allowing the user to recognize that the functions are common, and trivial differences are acceptable. For example, the trivial difference means that the functions coincide as a whole but the functions partially differ. Information relevant to the specifications of the functions and the operation units that are pinpointed by the specification difference pinpointing unit 116 is stored in a specification difference information DB 136, as specification difference information. Details of the specification difference pinpointing unit 116, the specification difference information and the specification difference information DB 136 will be described later.

The assist information providing unit 117 provides assist information by which the operation of the operation unit is assisted, based on the information relevant to the operation units that have different specifications and that are pinpointed by the specification difference pinpointing unit 116. For example, the assist information is previously stored in a guidance information DB 135 as guidance information. When the assist information providing unit 117 receives the information relevant to the specifications of the operation units pinpointed by the specification difference pinpointing unit 116, the assist information providing unit 117 refers to the guidance information in the guidance information DB 135, reads guidance information corresponding to the specifications of the operation units pinpointed by the specification difference pinpointing unit 116, and sends the guidance information to the portable terminal 30, the in-vehicle apparatus 200 and the like, as the assist information. The assist information is sent to the portable terminal 30, the in-vehicle apparatus 200 and the like, through the communication processing unit 120.

The assist information is not limited to information that is stored in the guidance information DB 135, and may be information that is distributed from a device in the exterior of the management server 10, for example. In this case, when the assist information providing unit 117 receives the information relevant to the specifications of the operation units pinpointed by the specification difference pinpointing unit 116, the assist information providing unit 117 requests, to the device in the exterior, a distribution of the guidance information corresponding to the specifications of the operation units pinpointed by the specification difference pinpointing unit 116. Details of the assist information providing unit 117 and the assist information will be described later.

The communication processing unit 120 sends and receives data by wireless communication. The communication processing unit 120 communicates with the vehicle 20 and the portable terminal 30.

In the storage unit 130, information that is used by the control unit 110 is stored. The storage unit 130 includes the user information DB 131, the reservation information DB 132, a use history information DB 133, the vehicle type-classified operation method DB 134 (a DB in which the specification information is stored), the guidance information DB 135 and the specification difference information DB 136.

FIG. 3 is a diagram showing an example of the user information DB 131. In the user information DB 131, a user ID, a password, the vehicle type of a private car and the like are stored for each user. The private car is a car that the user owns, and is a car that the user usually uses. That is, the private car is a car that is used at a high frequency by the user. In the user information DB 131, the name of the user, the user ID, the password, the vehicle type of the private car and the like are stored in association with the user.

For example, data that is stored in the user information DB 131 may be data that is input using a dedicated application installed in the portable terminal 30. In this case, the data input in the portable terminal 30 is sent from the portable terminal 30 to the management server 10. Further, the data that is stored in the user information DB 131 may be data that is input in a terminal device of a dealer that sells the private car. In this case, the data input in the terminal device of the dealer is sent from the terminal device of the dealer to the management server 10.

FIG. 4 is a diagram showing an example of the reservation information DB 132. In the reservation information DB 132, reservation information about each of a plurality of vehicles 20 is stored. FIG. 4 shows reservation information about a vehicle A (vehicle type α) and reservation information about three vehicles 20 other than the vehicle A. The reservation information includes a rental date and hour, a rental place, a return date and hour and a return place for the vehicle 20, the name of the user that has reserved the vehicle 20, and the like. In the reservation information DB 132, the rental date and hour, rental place, return date and hour and return place for the vehicle 20, and the like are stored in association with the name of the user that has reserved the vehicle 20. Information that is stored in the reservation information DB 132 is not limited to the information, and for example, when the user reserves the vehicle 20, the user may add a mail address of the portable terminal 30 and the like, in the reservation information DB 132.

FIG. 5 is a diagram showing an example of the use history information DB 133. In the use history information DB 133, use history information about each of a plurality of users is stored. FIG. 5 shows use history information about a user AAA and use history information about three users other than the user AAA. In the use history information DB 133, the vehicle type of a car that the user used in the past, a date and hour when the user started the use, a date and hour when the user ended the use, and the like are stored in association with the name of the user that used the vehicle 20. The number of uses of the vehicle type is calculated for the user, based on the use history information DB 133. Information that is stored in the use history information DB 133 is not limited to the above information, and for example, the use history information DB 133 may include information relevant to the number of uses for each of a plurality of vehicle types.

FIG. 6A is a diagram showing an example of the vehicle type-classified operation method DB 134. In the vehicle type-classified operation method DB 134, vehicle type-classified operation method information for each vehicle type is stored. In the example of FIG. 6A, vehicle type-classified operation method information about the vehicle type α and vehicle type-classified operation method information about vehicles other than the vehicle type α are stored in the vehicle type-classified operation method DB 134. The vehicle type-classified operation method information corresponds to the information (specification information) that is managed by the specification management unit 115. As the vehicle type-classified operation method information, for each vehicle type, information relevant to operation methods of a plurality of functions provided in the car is recorded. For example, the vehicle type-classified operation method information about the vehicle type α is associated with information indicating the model year of the vehicle type α, information indicating a function provided for the vehicle type α, and information indicating an operation method of an operation unit with which the function is set or operated. Instead of the information indicating the model year of the vehicle type α, the vehicle type-classified operation method information may be associated with information indicating a grade of the vehicle type α, or may be associated with both of the model year and the grade. When the grade is different, equipment of the vehicle is different even if the model year is the same, and therefore the specifications of the function and the operation unit vary depending on the grade. For simplification of description, a case of using information about the vehicle type α having different model years will be described below.

In the example of FIG. 6A, as for the vehicle type α, functions of three vehicles having different model years and operation methods of operation units for the functions are shown. In a Heisei 25 (2013) model year vehicle, the respective specifications of the operation units for four functions ("FUNCTION 1" to "FUNCTION 4") are denoted by X1, Y1, Z1 and A1. In a Heisei 26 (2014) model year vehicle, the respective specifications of the operation units for the four functions ("FUNCTION 1" to "FUNCTION 4") are denoted by X1, Y1, Z1 and A1. In the Heisei 26 model year vehicle, the four functions are carried over from the Heisei 25 model year vehicle. In a Heisei 27 (2015) model year vehicle, the respective specifications of the operation units for the four functions ("FUNCTION 1" to "FUNCTION 4") are denoted by X2, Y2, Z2 and A2. The Heisei 27 model year vehicle is a vehicle in which the same vehicle type α is remodeled, and the respective operation methods for the four functions, that is, the specifications of the operation units are altered in the Heisei 27 model year vehicle.

The specification of "FUNCTION 1" is adjustment of the scale of the map that is displayed on a display screen of the navigation device. The specification of "FUNCTION 2" is adjustment of the sound volume of the audio device, for example. The specification of "FUNCTION 3" is actuation or release of a parking brake, for example. The specification of "FUNCTION 4" is activation, release or speed adjustment of a cruise control, for example.

"OPERATION METHOD X1" is equivalent to the specification of the operation unit for "FUNCTION 1", and for example, is a method of turning a mechanical dial switch (operation unit) for navigation that is provided on a center console. "OPERATION METHOD Y1" is equivalent to the specification of the operation unit for "FUNCTION 2", and for example, is a method of turning a mechanical dial switch (operation unit) for audio that is provided on the center console. "OPERATION METHOD Z1" is equivalent to the specification of the operation unit for "FUNCTION 3", and for example, is a method of operating a lever-type handbrake (operation unit). "OPERATION METHOD A1" is equivalent to the specification of the operation unit for "FUNCTION 4", and for example, is a method of operating a lever-type switch (operation unit) that is provided on a steering column.

"OPERATION METHOD X2" is equivalent to the specification of the operation unit for "FUNCTION 1", and for example, is a method of performing a pinch operation (pinching-in or pinching-out) of a touch panel (operation unit) of the navigation device. "OPERATION METHOD Y2" is equivalent to the specification of the operation unit for "FUNCTION 2", and for example, is a method of operating a sound volume adjustment button that is displayed on a touch panel (operation unit) buried in the center console. "OPERATION METHOD Z2" is equivalent to the specification of the operation unit for "FUNCTION 3", and for example, is a method of operating a switch-type handbrake (operation unit) that is provided on the center console. "OPERATION METHOD A2" is equivalent to the specification of the operation unit for "FUNCTION 4", and for example, is a method of operating a button-type switch (operation unit) that is provided on a steering wheel.

The Heisei 26 model year vehicle is the same as the Heisei 25 model year vehicle in "OPERATION METHOD X1" to "OPERATION METHOD A1" corresponding to "FUNCTION 1" to "FUNCTION 4". However, the Heisei 27 model year vehicle is different from the Heisei 25 model year vehicle in "OPERATION METHOD X2" to "OPERATION METHOD A2" corresponding to "FUNCTION 1" to "FUNCTION 4". In this way, the operation method for the function is sometimes different depending on model year, even if the vehicle type is the same. For example, in the case where the Heisei 25 model year vehicle type α is a private car of the user (the vehicle before the switching) and the Heisei 27 model year vehicle type α is a shared car that the user does not usually use (the shared car has the same vehicle type as the Heisei 25 model year vehicle type α, and is the vehicle after the switching), for the user switching from the private car to the shared car, a long time is required before the user is accustomed to the operation, because the operation unit for each function is different.

In view of this problem, the identifier management unit 114, the specification management unit 115, the specification difference pinpointing unit 116, the assist information providing unit 117 and the like are provided in the information processing system 1 according to the embodiment. A relation between the specification management unit 115 and the vehicle type-classified operation method DB 134 will be described below. The specification management unit 115 manages each specification of the first function, the second function, the first operation unit and the second operation unit, based on the information input from the identifier management unit 114. Here, it is assumed that the Heisei 25 model year vehicle type α is a private car of the user and the Heisei 27 model year vehicle type α is a shared car that the user does not usually use.

The specification management unit 115 associates and manages the specifications of a plurality of functions (for example, "FUNCTION 1" to "FUNCTION 4") provided in the vehicle of the Heisei 25 model year vehicle type α and the specifications of the operation units for operating the functions, based on the third identifier of the user and the first identifier (for example, identification information for uniquely identifying the Heisei 25 model year vehicle type α) of the first vehicle, which are managed by the identifier management unit 114. The specifications of the plurality of functions and the specifications of the operation units may be based on information that is previously stored in the storage unit 130, or may be recorded from the exterior of the management server 10 at the time of the car switching by the user.

Further, the specification management unit 115 associates and manages the specifications of a plurality of functions (for example, "FUNCTION 1" to "FUNCTION 4") provided in the vehicle of the Heisei 27 model year vehicle type α and the specifications of the operation units for operating the functions, based on the third identifier of the user and the second identifier (for example, identification information for uniquely identifying the Heisei 27 model year vehicle type α) of the second vehicle, which are managed by the identifier management unit 114.

The vehicle type, the specifications of the functions and the specifications of the operation units that are associated in this way are stored in the vehicle type-classified operation method DB 134, as the specification information.

Next, the specification difference information DB 136 will be described. FIG. 6B is a diagram showing an example of the specification difference information DB 136. In the specification difference information DB 136, the specification difference information for each vehicle type is stored. In the example of FIG. 6B, for example, specification difference information about the vehicle type α and specification difference information about vehicle types other than the vehicle type α are stored in the specification difference information DB 136. The specification difference information is information that is managed by the specification difference pinpointing unit 116. As the specification difference information, for two operation units for which the specification of the function is common (the same) and the specification of the operation unit is different before and after the switching, information relevant to the specification of the operation unit of the vehicle before the switching and information relevant to the specification of the operation unit of the vehicle after the switching are associated and recorded for each vehicle type.

For example, in information relevant to the specification (map scale adjustment) of "FUNCTION 1" of the vehicle type α, the specification "TURNING OF DIAL SWITCH" of the operation unit of the vehicle before the switching is different from the specification "PINCH OPERATION OF TOUCH PANEL" of the operation unit of the vehicle after the switching. Therefore, as the specification difference information about the vehicle type α, the information relevant to the specification (map scale adjustment) of "FUNCTION 1" of the vehicle type α is associated with the information of the specification "TURNING OF DIAL SWITCH" of the operation unit of the vehicle before the switching and the information of the specification "PINCH OPERATION OF TOUCH PANEL" of the operation unit of the vehicle after the switching.

Further, in formation relevant to the specification (activation and the like of cruise control) of "FUNCTION 4" of the vehicle type α, the specification "OPERATION OF LEVER-TYPE SWITCH" of the operation unit of the vehicle before the switching is different from the specification "OPERATION OF BUTTON-TYPE SWITCH" of the operation unit of the vehicle after the switching. Therefore, as the specification difference information about the vehicle type α, the information relevant to the specification (activation and the like of cruise control) of "FUNCTION 4" is associated with the information of the specification "OPERATION OF LEVER-TYPE SWITCH" of the operation unit of the vehicle before the switching and the specification "OPERATION OF BUTTON-TYPE SWITCH" of the operation unit of the vehicle after the switching.

The specification difference pinpointing unit 116 refers to the specification information managed by the specification management unit 115 and the information about the first identifier, second identifier and third identifier linked with each other by the identifier management unit 114, and compares the specification (the specification of the operation unit of the vehicle before the switching; TURNING OF DIAL SWITCH) of the first operation unit corresponding to the first function (for example, the specification of "FUNCTION 1" of the vehicle before the switching) and the specification (the specification of the operation unit of the vehicle after the switching; PINCH OPERATION OF TOUCH PANEL) of the second operation unit corresponding to the second function (for example, the specification of "FUNCTION 1" of the vehicle after the switching). Thereby, the specification difference pinpointing unit 116 pinpoints two operation units for which the specification of the function is common (the same) and the specification of the operation unit is different.

For example, in the case where a different management number is assigned to each specification of the operation unit at the time of vehicle manufacture, the comparison behavior is performed based on whether management numbers coincide. The comparison behavior is not limited to this. The information relevant to the operation units that have different specifications and that are pinpointed by the specification difference pinpointing unit 116 is stored in the specification difference information DB 136, as the specification difference information.

Figure 6C:
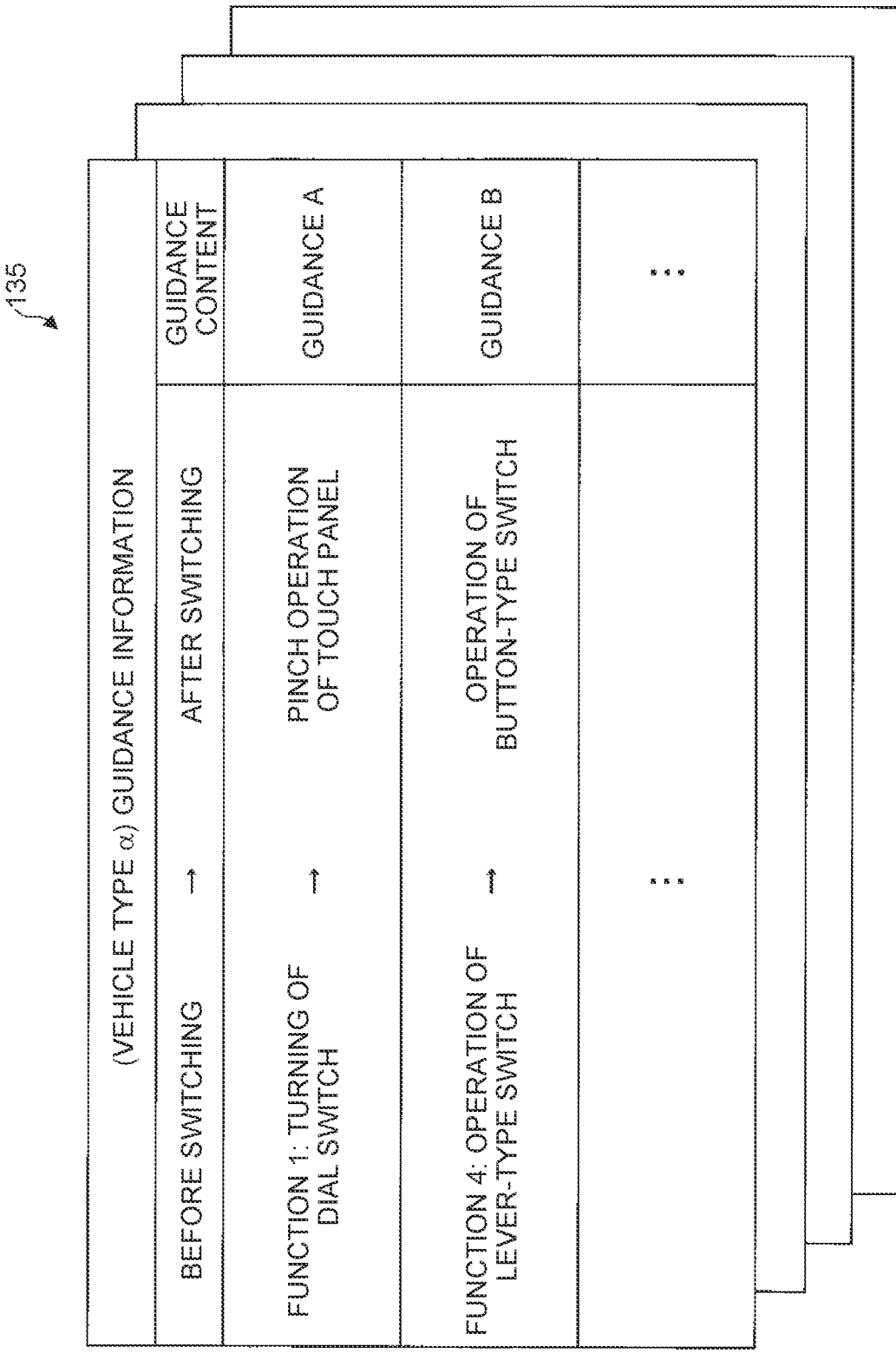
FIG. 6C is a diagram showing an example of a guidance information DB 135.

Next, the guidance information DB 135 will be described. FIG. 6C is a diagram showing an example of the guidance information DB 135. In the guidance information DB 135, the guidance information for each vehicle type is stored. In the example of FIG. 6C, guidance information about the vehicle type α and guidance information about vehicle types other than the vehicle type α are stored in the guidance information DB 135. The guidance information is assist information for assisting the operation of the operation unit. As the guidance information, for two operation units for which the specification of the function is common (the same) and the specification of the operation unit is different before and after the switching, information relevant to guidance contents for the guide about the operation methods of the operation units is stored for each vehicle type.

For example, the guidance information about the vehicle type α is associated with the specification of the operation unit corresponding to "FUNCTION 1" before the switching, the specification of the operation unit corresponding to "FUNCTION 1" after the switching, and information of "GUIDANCE A". For example, in the case of the switching of the vehicle type α from the Heisei 25 model year vehicle 20 to the Heisei 27 model year vehicle 20, the guidance A is guide information for assisting the operation of the operation unit corresponding to "FUNCTION 1".

Further, the guidance information about the vehicle type α is associated with the specification of the operation unit corresponding to "FUNCTION 4" before the switching, the specification of the operation unit corresponding to "FUNCTION 4" after the switching, and information of "GUIDANCE B". For example, in the case of the switching of the vehicle type α from the Heisei 25 model year vehicle 20 to the Heisei 27 model year vehicle 20, the guidance B is guide information for assisting the operation of the operation unit corresponding to "FUNCTION 4".

The contents of the assist information are set from a standpoint of how a user switching to an unfamiliar vehicle should use a different operation unit from that of a vehicle before the switching, for operating or setting a desired function (for example, "FUNCTION 1").

FIG. 6D is a diagram for describing a specific example of the guidance information shown in FIG. 6C. As shown in FIG. 6D, for example, the guidance A has a content "METHOD FOR ADJUSTING SCALE OF MAP: PERFORM OPERATION OF DIAL SWITCH BEFORE SWITCHING, AND PERFORM PINCH OPERATION ON SCREEN AFTER SWITCHING". Further, for example, the guidance B has a content "METHOD FOR SETTING CRUISE CONTROL: PERFORM OPERATION OF LEVER-TYPE SWITCH BEHIND STEERING WHEEL BEFORE SWITCHING AND PERFORM OPERATION OF BUTTON-TYPE SWITCH ON STEERING WHEEL AFTER SWITCHING".

The guidance A and the guidance B are not limited to the above contents, and only need to be information for assisting the user such that the user can set or operate a desired function in the vehicle after the switching, without trouble, in the case where the operation method for the function is different before and after the switching. The guidance A and the guidance B are set from a standpoint of how a user switching to an unfamiliar vehicle should use a different operation unit from that of a vehicle before the switching, for operating or setting a desired function. For example, the guidance A may have a content "PERFORM PINCH OPERATION ON SCREEN FOR ADJUSTING SCALE OF MAP. PINCH OPERATION CORRESPONDS TO OPERATION OF DIAL SWITCH BEFORE SWITCHING".

The guidance A and the guidance B may be displayed on a screen of the portable terminal 30 or the in-vehicle apparatus 200, or may be emitted from a speaker of the portable terminal 30 or the in-vehicle apparatus 200. In this case, the assist information providing unit 117 reads information recorded in the guidance information DB 135, and sends the read information to the portable terminal 30 or the in-vehicle apparatus 200 through the communication processing unit 120. Thereby, the playback of the guidance A and the guidance B is executed by the portable terminal 30 or the in-vehicle apparatus 200. Based on the sent information, the portable terminal 30 or the in-vehicle apparatus 200 plays back the guidance with a text or the guidance with a voice, in accordance with the guidance information, and thereby can assist the operation by the user.

The timing when the guidance A and the guidance B are played back by the portable terminal 30 or the in-vehicle apparatus 200 may be a timing right after a start switch is pushed for turning on an accessory power source of the vehicle, or may be a timing when a particular operation unit is operated.

Further, the timing when the guidance A and the guidance B are played back by the portable terminal 30 may be, for example, a timing when a predetermined acceleration is detected in the portable terminal 30. Specifically, when the user of the portable terminal 30 pushes the start switch for turning on the accessory power source and thereafter shakes the portable terminal 30 such that a certain or higher acceleration is generated, an action detection signal indicating that the user has shaken the portable terminal 30 is input to the in-vehicle apparatus 200. Then, the in-vehicle apparatus 200 sends a guidance distribution request to the management server 10. The assist information providing unit 117, after receiving the distribution request, refers to the guidance information DB 135, and sends the corresponding guidance information to the portable terminal 30.

By using the acceleration that is detected in the portable terminal 30 in this way, it is possible to play back the guidance only when the assist relevant to the operation of the operation unit is necessary. Therefore, in the case where the user determines that the assist relevant to the operation of the operation unit is unnecessary, the unnecessary information is not played back, so that the user can focus on driving without having an uncomfortable feeling.

Figure 7:
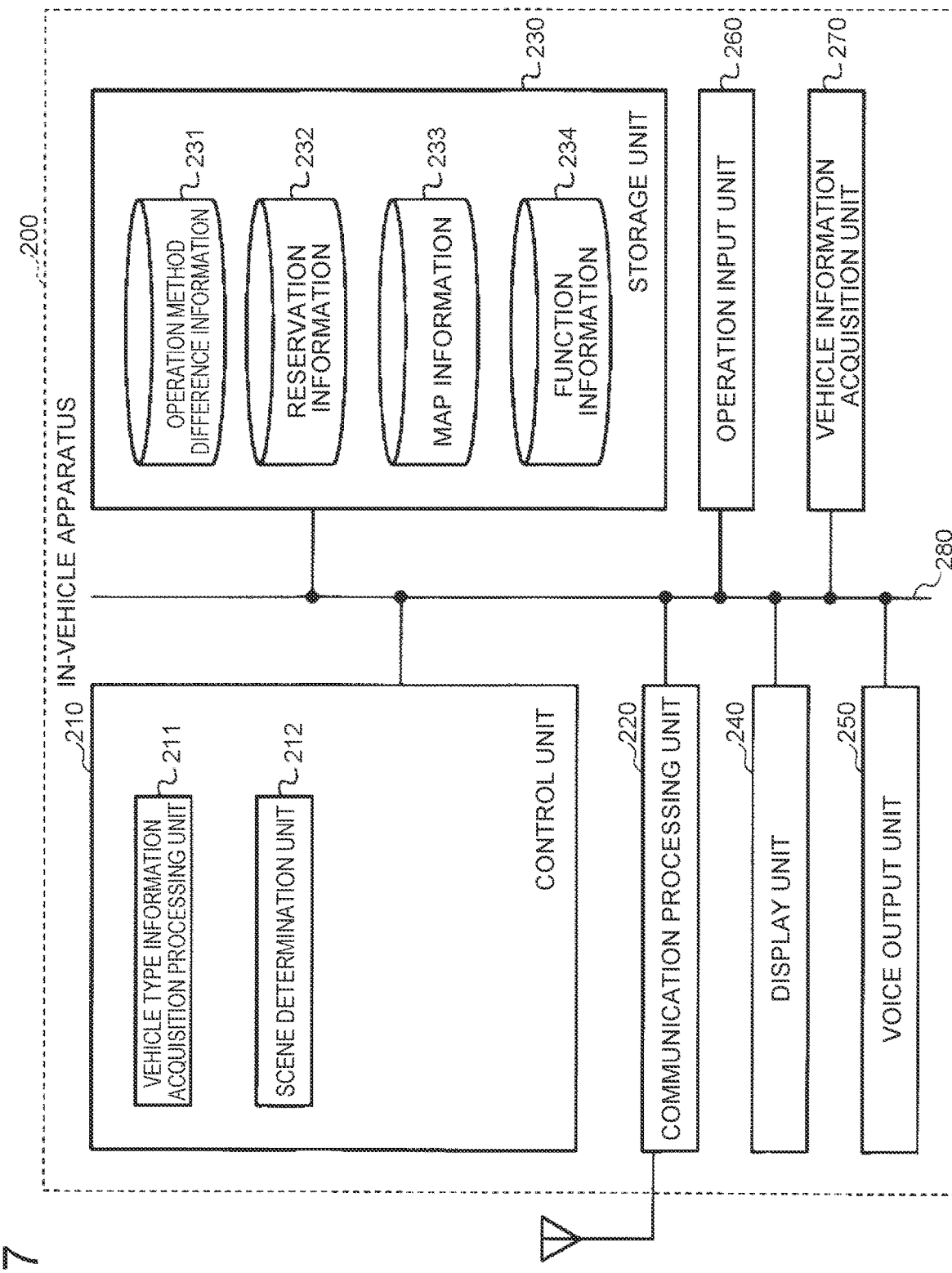
FIG. 7 is a diagram showing a configuration example of an in-vehicle apparatus 200.

Next, a configuration of the in-vehicle apparatus 200 will be described with use of FIG. 7 and the like. FIG. 7 is a diagram showing a configuration example of the in-vehicle apparatus 200. The in-vehicle apparatus 200 includes a control unit 210, a communication processing unit 220, a storage unit 230, a display unit 240, a voice output unit 250, an operation input unit 260, a vehicle information acquisition unit 270 and a bus line 280. The control unit 210, the communication processing unit 220, the storage unit 230, the display unit 240, the voice output unit 250, the operation input unit 260 and the vehicle information acquisition unit 270 are connected through the bus line 280, so as to be able to communicate with each other.

The control unit 210 includes a CPU, a ROM, a RAM and an input-output interface, which are not illustrated. The CPU is a processor that controls the whole behavior of the in-vehicle apparatus 200. In the ROM, dedicated programs for realizing functions (a vehicle type information acquisition processing unit 211 and a scene determination unit 212) of the in-vehicle apparatus 200 are stored. The RAM is a memory that is used as a work area for the CPU. When the power source is turned on, the CPU realizes various functions by executing the dedicated programs recorded in the ROM.

The vehicle type information acquisition processing unit 211 acquires information about different operation methods for the functions of the vehicle type of the car for which the use frequency of the user is high, from the management server 10 or the portable terminal 30 of the user. The vehicle type information acquisition processing unit 211 stores the acquired information in an operation method difference information DB 231.

The scene determination unit 212 determines the state of the vehicle 20, and the like, based on information from the vehicle information acquisition unit 270 of the vehicle 20. Based on the state of the vehicle 20, the scene determination unit 212 guides the user about an appropriate operation method for the function, through the display unit 240 and the operation input unit 260.

The communication processing unit 220 sends and receives data by wireless communication. The communication processing unit 220 communicates with the management server 10 and the portable terminal 30. The communication processing unit 220 may send and receive data by wire communication. For example, the communication processing unit 220 may be connected with the portable terminal 30 through a wire, to send and receive data. For example, the communication processing unit 220 is a module based on Data Communication Module (DCM) that is a communication standard for in-vehicle devices and World Wide Interoperability for Microwave Access (WiMAX) that is a wireless communication standard.

In the storage unit 230, information that is used by the control unit 210 and the like is stored. The storage unit 230 contains the operation method difference information DB 231, a reservation information DB 232 and a map information DB 233.

FIG. 8 is a diagram showing an example of the operation method difference information DB 231. In the operation method difference information DB 231, the information about the different operation methods for the functions of the vehicle type of the car for which the use frequency of the user is high is stored. Further, in the operation method difference information DB 231, priorities of the different operation methods for the functions of the vehicle type of the car for which the use frequency of the user is high can be stored. In the case of the guide about the operation method for the function, an operation method having a high priority is preferentially presented. The priorities may be previously decided in a function information DB 234. In the operation method difference information DB 231, information about identical operation methods for the functions of the vehicle type of the car for which the use frequency of the user is high may be stored.

In the reservation information DB 232, the reservation information received from the portable terminal 30 is stored.

In the map information DB 233, map information that is used at the time of a road guide by the in-vehicle apparatus 200 is stored. The map information includes information about roads, facilities and the like.

FIG. 9 is a diagram showing an example of the function information DB 234. In the function information DB 234, information about the state of the car and the like at the time of use of the functions of the vehicle 20 is stored. Examples of the state of the car and the like include "an engine has been started", "the current position is a gas station, and the car is at standstill", and "a shift lever has set to reverse". For a single function, information about a plurality of states and the like may be stored. In the function information DB 234, the state of the car and a function of the car that should be used in that state are associated and stored. The function information DB 234 may include information about a priority for each function.

Back to FIG. 7, the display unit 240 performs display, for example, based on display screen data that is sent from the control unit 210 or the like. For example, the display unit 240 is a display device such as a liquid crystal display (LCD) or an organic electroluminescence (EL) display.

The voice output unit 250 performs voice output, for example, based on voice data that is sent from the control unit 210 or the like. For example, the voice output unit 250 is a speaker.

The operation input unit 260 accepts a command from the user to the in-vehicle apparatus 200. Examples of the operation input unit 260 include various switches, a touch sensor and a voice input device.

The vehicle information acquisition unit 270 acquires information relevant to the state of the vehicle 20 and the like, for example, from a sensor of each part of the vehicle 20.

Figure 10:
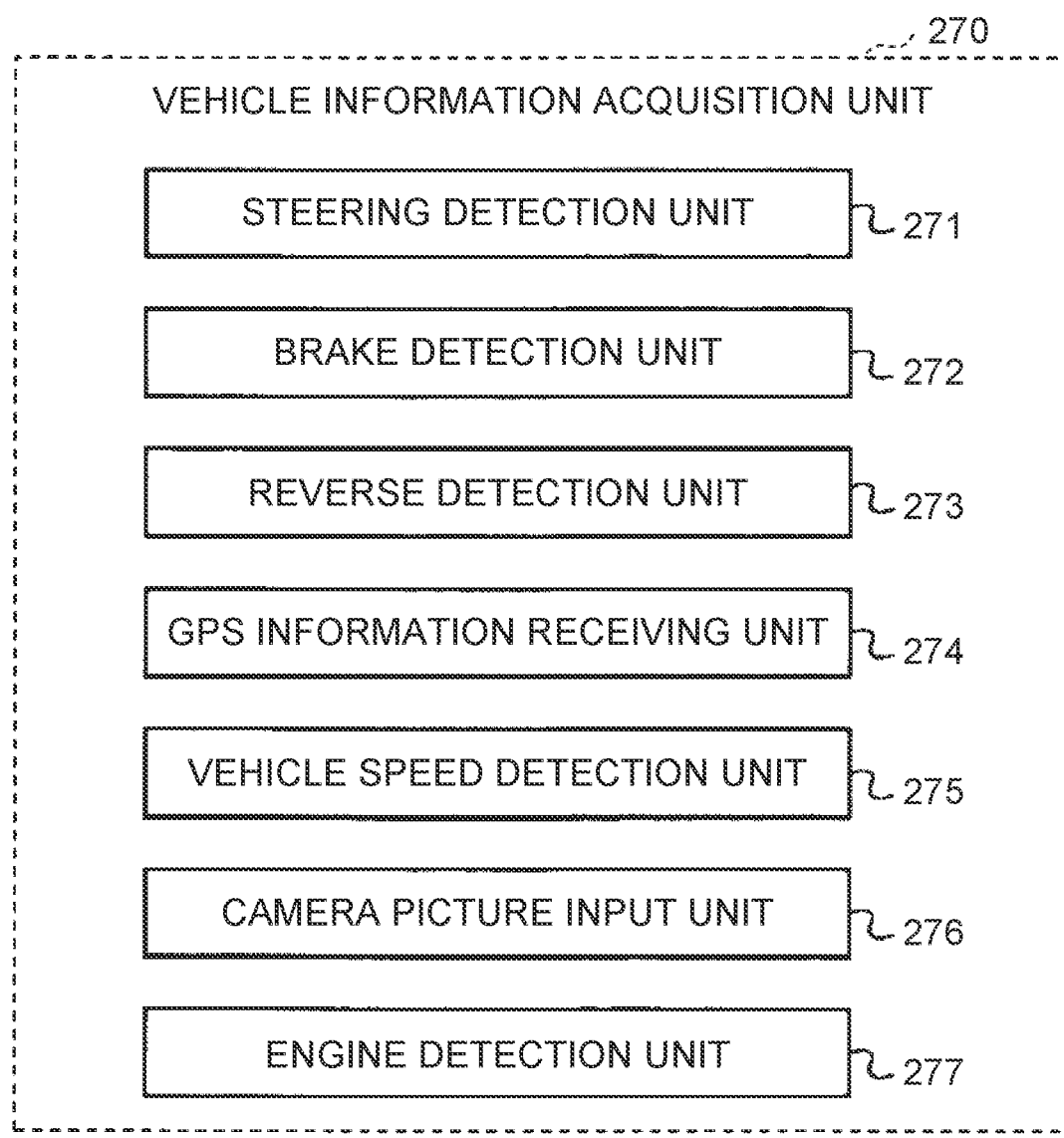
FIG. 10 is a diagram showing an example of a vehicle information acquisition unit 270.

FIG. 10 is a diagram showing an example of the vehicle information acquisition unit 270. In the example of FIG. 10, the vehicle information acquisition unit 270 includes a steering detection unit 271, a brake detection unit 272, a reverse detection unit 273, a GPS information receiving unit 274, a vehicle speed detection unit 275, and a camera picture input unit 276. The vehicle information acquisition unit 270 may include another detection unit, another sensor and the like. For example, the vehicle information acquisition unit 270 may include a fuel sensor, a water temperature sensor, a rain sensor, a road surface sensor, an eyesight sensor, an air pressure sensor, and a light-dark sensor.

The steering detection unit 271 detects a steering pulse signal that is generated depending on the turning angle of the steering wheel. The steering detection unit 271 sends the detected steering pulse signal to the control unit 210. For example, the steering pulse signal that is detected by the steering detection unit 271 is output whenever the steering wheel is turned by a predetermined angle. The steering detection unit 271 electrically detects the steering pulse signal through a terminal.

The brake detection unit 272 detects whether the parking brake of the vehicle is being applied. The brake detection unit 272 gives a notice of the detection result to the control unit 210. For example, the brake detection unit 272 detects whether the parking brake is being applied, based on an electric conduction state of a switch that is turned on or off in conjunction with movement of a parking brake lever (or a parking brake pedal). For example, the brake detection unit 272 electrically detects the electric conduction state of the switch through a terminal.

The reverse detection unit 273 detects whether a shift lever (or a gear shift lever) of the vehicle has been set to the reverse (rearward movement). The reverse detection unit 273 gives a notice of the detection result to the control unit 210. For example, the reverse detection unit 273 detects whether the shift lever has been set to the reverse, based on an electric conduction state of a switch that is turned on or off in conjunction with the shift lever. For example, the reverse detection unit 273 electrically detects the electric conduction state of the switch through a terminal.

The GPS information receiving unit 274 receives electric wave signals from global positioning system (GPS) satellites through a GPS antenna that is connected to a terminal, and sends the received signal to the control unit 210. The GPS is a system that measures the position of the GPS antenna based on electric waves from at least three GPS artificial satellites of many GPS artificial satellites that go around the Earth.

Here, as a GNSS, a positioning system using the GPS is applied. However, the GNSS is not limited to the GPS, and a positioning system using satellites, as exemplified by Galileo and a global navigation satellite system (GLONASS), may be used. The GNSS is a positioning system in which a positioning device equipped in a movable body measures the position of the movable body, using signals from satellites.

The vehicle speed detection unit 275 detects a vehicle speed pulse signal that is generated depending on the rotation angle of an axle. The vehicle speed detection unit 275 sends the detected vehicle speed pulse signal to the control unit 210. The vehicle speed pulse signal that is detected by the vehicle speed detection unit 275 is a stepwise pulse signal to be output from the vehicle speed sensor or an electronic control unit that controls the engine or brake of the vehicle. For example, the vehicle speed pulse signal is output whenever the axle is rotated by a predetermined angle. The relation between the vehicle speed pulse signal and the movement distance of the vehicle varies depending on a manufacturer that manufactures the vehicle, the vehicle type, the size and air pressure of a wheel attached to the vehicle, and the like. Therefore, the control unit 210 may appropriately calibrate the vehicle speed to be indicated by the detected vehicle speed pulse signal, based on the movement distance of the vehicle that is calculated from the positioning result of the GPS. The vehicle speed detection unit 275 electrically detects the vehicle speed pulse signal through a terminal.

The camera picture input unit 276 receives a picture signal from a camera (a still camera or a video camera) that images a rearward view of the vehicle. The camera picture input unit 276 sends the received picture signal to the control unit 210. When the reverse detection unit 273 detects the reverse of the vehicle, the camera picture input unit 276 sends the picture signal from the camera connected to a terminal, to the control unit 210.

The engine detection unit 277 detects whether the engine is being driven. The engine detection unit gives a notice of the detection result to the control unit 210. For example, the engine detection unit 277 detects whether the engine is being driven, based on an electric conduction state of a switch that is turned on or off in conjunction with rotation of the engine. The engine detection unit 277 electrically detects the electric conduction state of the switch through a terminal.

Figure 11:
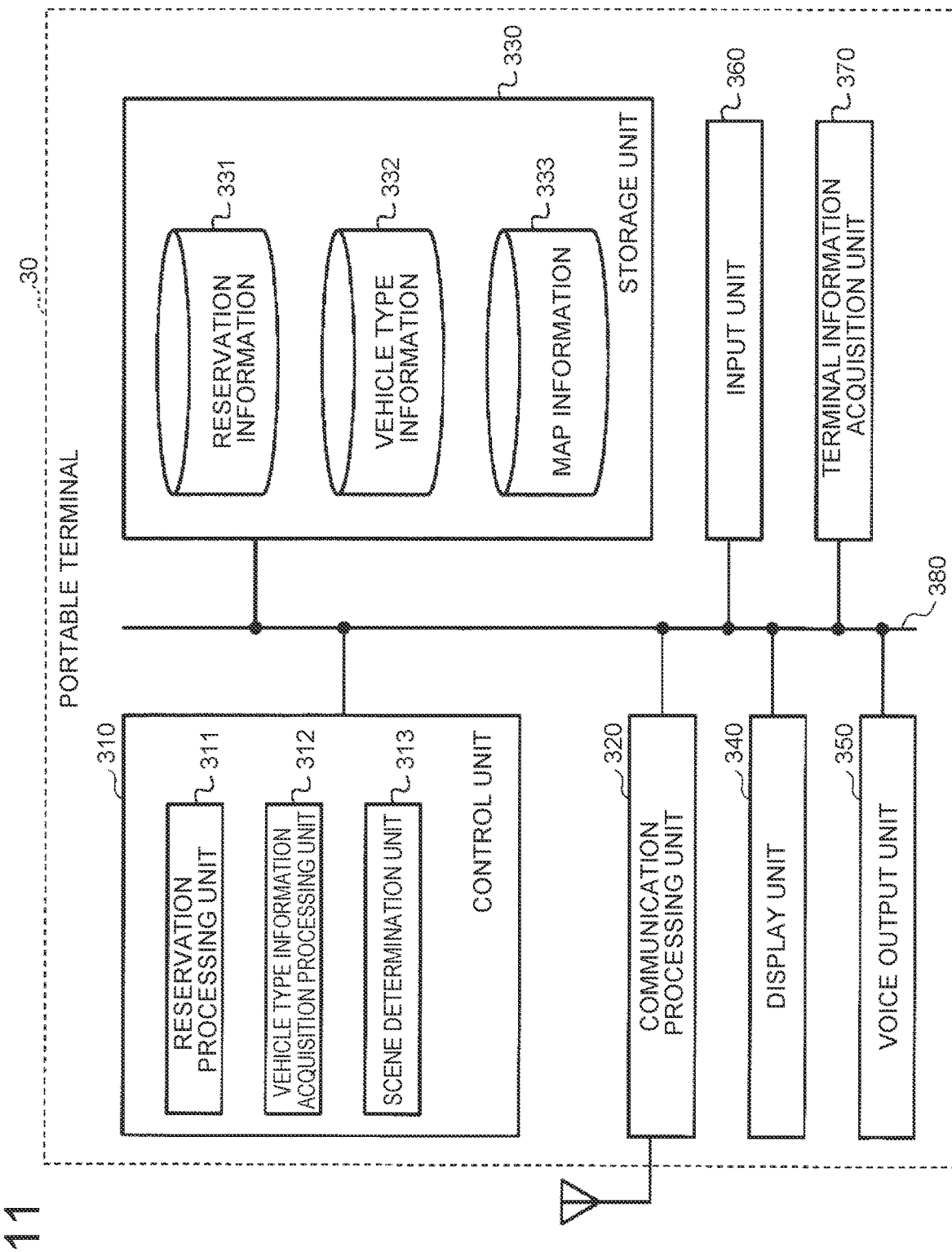
FIG. 11 is a diagram showing a configuration example of a portable terminal 30.

Next, a configuration of the portable terminal 30 will be described with use of FIG. 11 and the like. FIG. 11 is a diagram showing a configuration example of the portable terminal 30. The portable terminal 30 includes a control unit 310, a communication processing unit 320, a storage unit 330, a display unit 340, a voice output unit 350, an input unit 360, a terminal information acquisition unit 370 and a bus line 380. The control unit 310, the communication processing unit 320, the storage unit 330, the display unit 340, the voice output unit 350, the input unit 360 and the terminal information acquisition unit 370 are connected through the bus line 380, so as to be able to communicate with each other.

The control unit 310 includes a CPU, a ROM, a RAM and an input-output interface, which are not illustrated. The CPU is a processor that controls the whole behavior of the portable terminal 30. In the ROM, dedicated programs for realizing functions (a reservation processing unit 311, a vehicle type information acquisition processing unit 312 and a scene determination unit 313) of the portable terminal 30 are stored. The RAM is a memory that is used as a work area for the CPU. When the power source is turned on, the CPU realizes various functions by executing the dedicated programs recorded in the ROM.

The reservation processing unit 311 accepts the reservation for the use of the car, from the user, and performs a reservation process for the use of the car by the user, to the management server 10.

The vehicle type information acquisition processing unit 312 receives the operation method for the function of the car from the management server 10, and stores the operation method in the vehicle type information DB 332.

The scene determination unit 313 determines the state of the vehicle 20 and the like, based on information (position information and acceleration information) from the terminal information acquisition unit 370 and map information. The scene determination unit 313 presents an appropriate operation method for the function, through the display unit 340 and the voice output unit 350, depending on the state of the vehicle 20.

The communication processing unit 320 sends and receives data by wireless communication. The communication processing unit 320 communicates with the management server 10 and the vehicle 20. The communication processing unit 320 may send and receive data by wire communication. For example, the communication processing unit 320 may be connected with the vehicle 20 through a wire, to send and receive data.

In the storage unit 330, information that is used by the control unit 310 is stored. The storage unit 330 contains a reservation information DB 331, a vehicle type information DB 332 and a map information DB 333.

In the reservation information DB 331, reservation information included in a reservation completion notice received from the management server 10 is stored.

In the vehicle type information DB 332, the vehicle type of the car that is reserved by the user and the vehicle type of the car for which the use frequency of the user is high are stored. In the vehicle type information DB 332, the operation method for the function for each vehicle type can be stored. For example, the operation method for the function for each vehicle type is acquired from the management server 10.

In the map information DB 333, map information that is used at the time of the road guide or the like is stored. The map information includes information about roads, facilities and the like.

The display unit 340 performs display, for example, based on display screen data that is sent from the control unit 310 or the like. For example, the display unit 340 is a display device such as an LCD or an organic EL display.

The voice output unit 350 performs voice output, for example, based on voice data that is sent from the control unit 310 or the like. For example, the voice output unit 350 is a speaker.

The input unit 360 accepts a command from the user. Examples of the input unit 360 include various switches, a touch sensor and a voice input device.

The terminal information acquisition unit 370 acquires information relevant to the state of the portable terminal 30 and the like, for example, from a sensor of each part of the portable terminal.

Figure 12:
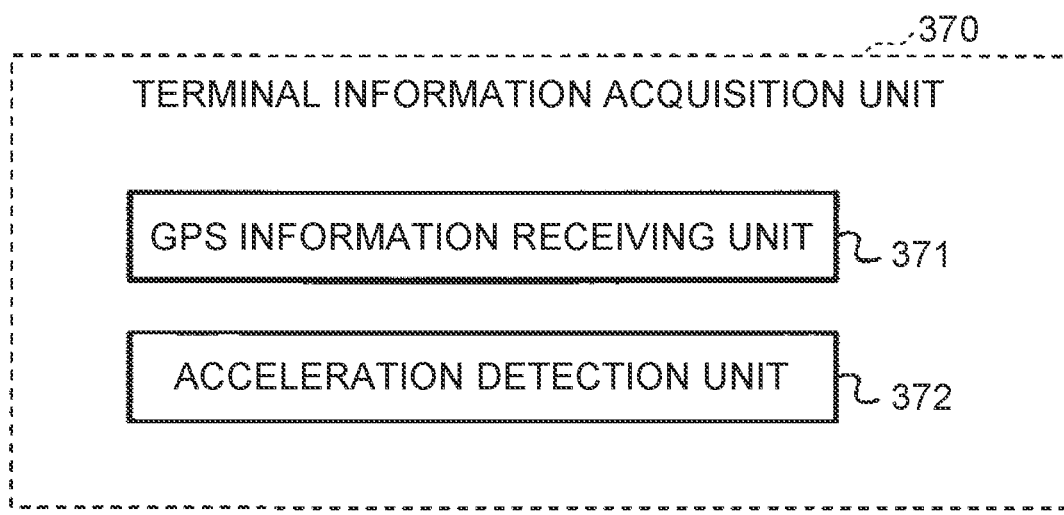
FIG. 12 is a diagram showing an example of a terminal information acquisition unit 370.

FIG. 12 is a diagram showing an example of the terminal information acquisition unit 370. In the example of FIG. 12, the terminal information acquisition unit 370 includes a GPS information receiving unit 371 and an acceleration detection unit 372. The terminal information acquisition unit 370 may include another detection unit, another sensor and the like.

The GPS information receiving unit 371 receives electric wave signals from GPS satellites through a GPS antenna that is connected to a terminal, and sends the received signal to the control unit 310. The GNSS is not limited to the GPS, and a positioning system using satellites, as exemplified by Galileo and GLONASS, may be used.

The acceleration detection unit 372 detects an acceleration pulse signal that is generated depending on the acceleration of the portable terminal 30. The acceleration detection unit 372 sends the detected acceleration pulse signal to the control unit 310. The acceleration pulse signal that is detected by the acceleration detection unit 372 is a pulse signal that is output from an acceleration sensor or the like. The acceleration of the portable terminal 30 is calculated from the acceleration pulse signal. After the acceleration is calculated, the movement speed and movement distance of the portable terminal 30 are calculated. When the portable terminal 30 is not strongly moved, the acceleration, movement speed and movement distance of the portable terminal 30 within the vehicle 20 can be regarded as being the same as the acceleration, movement speed and movement distance of the vehicle 20. The control unit 310 may appropriately calibrate the acceleration to be indicated by the detected acceleration pulse signal, based on the movement distance of the portable terminal 30 that is calculated from the positioning result of the GPS. The acceleration detection unit 372 electrically detects the acceleration pulse signal through a terminal.

Behavior Example

Behavior Example at Time of Reservation (Portable Terminal)

FIG. 13 is a diagram showing an example of a behavior flow of the portable terminal 30 at the time of reservation. FIG. 13 is an example of a behavior flow when the user reserves the vehicle 20 to be used. The control unit 310 of the portable terminal 30 executes a computer program that is stored in the storage unit 330, when the power source switch is turned on or when a predetermined operation is performed by the user. By the execution of the computer program, each function unit of the control unit 310 is realized. When the user selects a reservation processing function, the behavior flow of the reservation process in FIG. 13 is started by the behavior of the reservation processing unit 311 of the portable terminal 30.

The reservation processing unit 311 requests the input of the user ID and the password, to the user (S101). The reservation processing unit 311 displays a message that prompts the user to input the user ID and the password, on the display unit 340. In accordance with the message displayed on the display unit 340, the user inputs the user ID and the password through the input unit 360.

After the user ID and the password are input, the reservation processing unit 311 sends the input user ID and password to the management server 10 through the communication processing unit 320 (S102). The management server 10 performs user authentication based on the user ID and password sent from the portable terminal 30.

The reservation processing unit 311 waits until the reservation processing unit 311 receives an authentication result from the management server 10 (S103: NO). After the reservation processing unit 311 receives the authentication result (FIG. 14: S204 or S206) sent by the management server 10 through the communication processing unit 320 (S103; YES), the reservation processing unit 311 checks whether the user has been authenticated (S104). In the case where the user has not been authenticated (S104; NO), the process returns to step S101.

In the case where the user has been authenticated (S104; YES), the reservation processing unit 311 receives reservation status information (FIG. 14: S208) sent by the management server 10, through the communication processing unit 320 (S105). The reservation status information includes information about a car (vehicle type) that can be currently reserved for use in the information processing system 1, an available period, a rental place, a return place and the like.

The reservation processing unit 311 accepts a reservation condition from the user (S106). The reservation processing unit 311 causes the display unit 340 to display the received reservation status information. Further, the reservation processing unit 311 causes the display unit 340 to display a message that prompts the user to input the reservation condition, based on the reservation status information. For example, the reservation condition is information about a rental date and hour, a rental place, a return date and hour, a return place and a used vehicle type. In accordance with the message displayed on the display unit 340, the user inputs the reservation condition through the input unit 360.

After the reservation condition is input, the reservation processing unit 311 sends the input reservation condition to the management server 10 through the communication processing unit 320 (S107). The management server 10 performs the reservation process based on the reservation condition sent from the portable terminal 30, and sends the reservation completion notice to the portable terminal 30.

The reservation processing unit 311 waits until the reservation processing unit 311 receives the reservation completion notice from the management server 10 (S108; NO). After the reservation processing unit 311 receives the reservation completion notice (FIG. 16: S223) sent by the management server 10 through the communication processing unit 320 (S108; YES), the reservation processing unit 311 stores the reservation completion notice received from the management server 10, in the reservation information DB 331 of the storage unit 330, as the reservation information, and the behavior flow of the reservation process ends. The reservation completion notice (reservation information) includes the rental date and hour, the rental place, the return date and hour, the return place, and the used vehicle type. Further, the reservation completion notice (reservation information) can include information about operation methods for the same function that are different between the vehicle type of the car for which the use frequency of the user is high (or the vehicle type of the car that is owned by the user) and the vehicle type of the reserved car.

By the behavior flow in FIG. 13, the user can reserve the vehicle 20 with the portable terminal 30. The information about the operation methods for the same function that are different between the vehicle type of the car for which the use frequency of the user is high (or the vehicle type of the car that is owned by the user) and the vehicle type of the reserved car can be stored in the reservation information DB 331 of the storage unit 330 of the portable terminal 30.

Behavior Example at Time of Reservation (Management Server)

Figure 14:
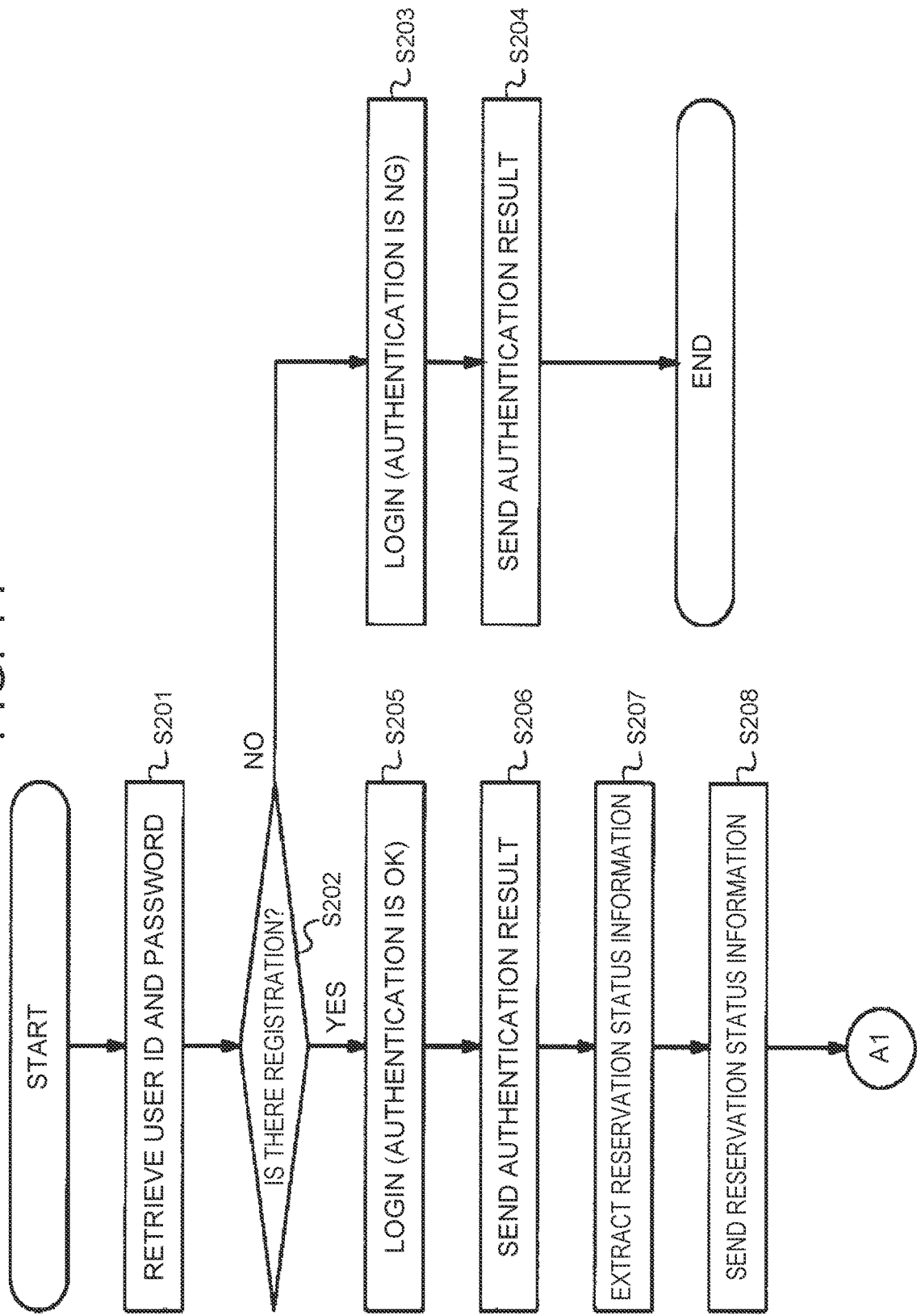
FIG. 14 is a diagram showing a first behavior flow of the management server 10 at the time of reservation.
Figure 15:
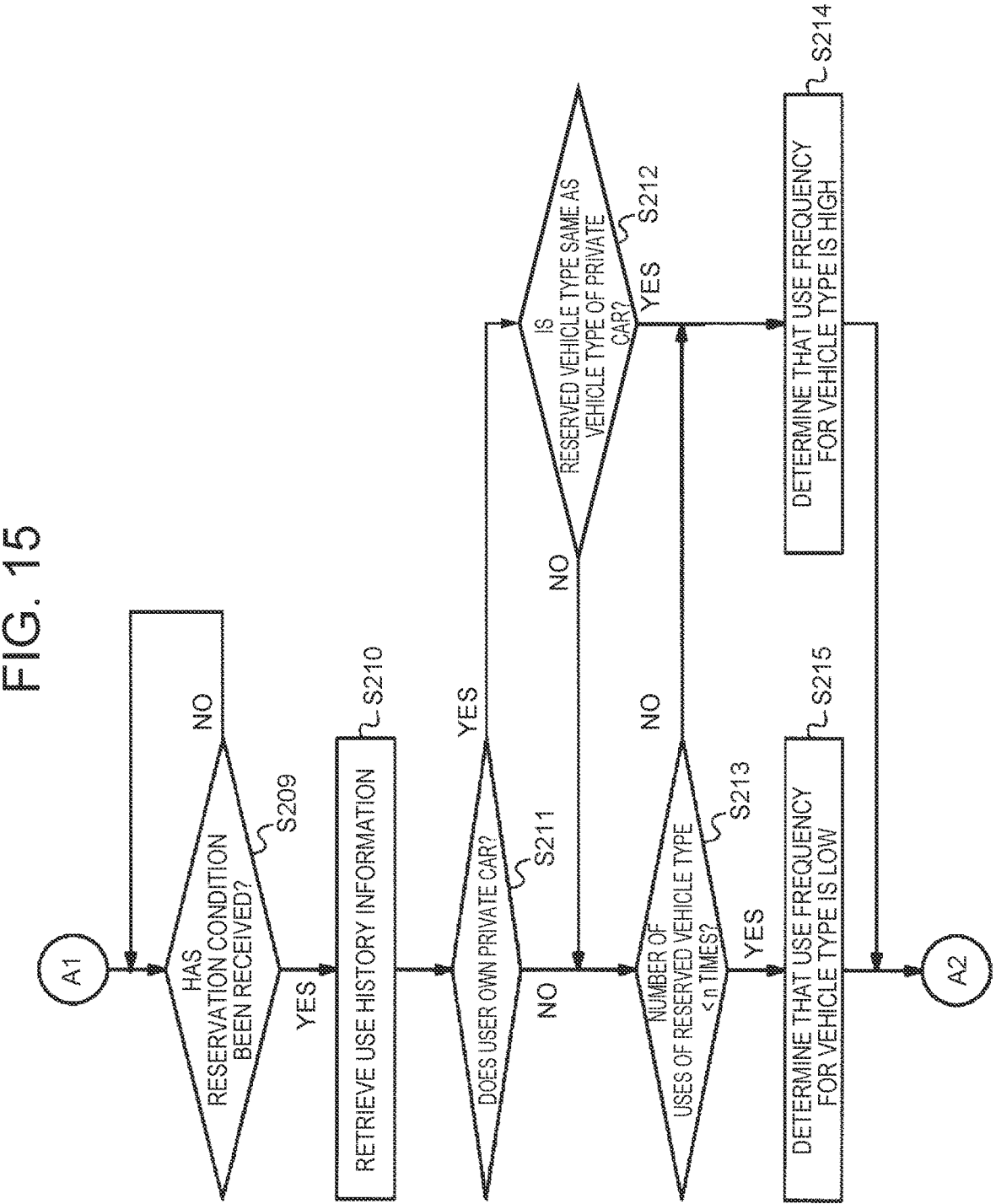
FIG. 15 is a diagram showing a second behavior flow of the management server 10 at the time of reservation.
Figure 16:
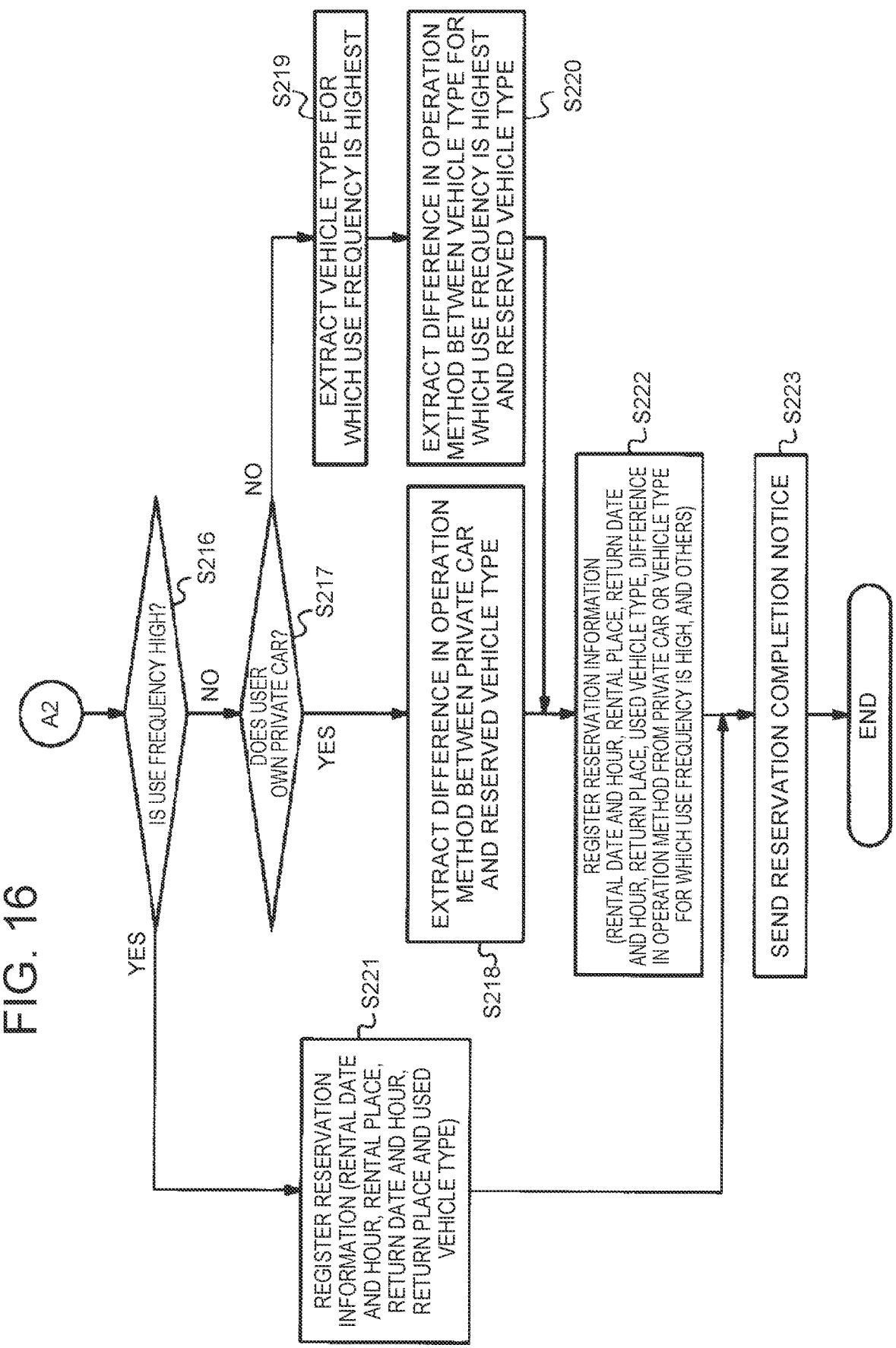
FIG. 16 is a diagram showing a third behavior flow of the management server 10 at the time of reservation.

FIG. 14 is a diagram showing a first behavior flow of the management server 10 at the time of reservation. FIG. 15 is a diagram showing a second behavior flow of the management server 10 at the time of reservation. FIG. 16 is a diagram showing a third behavior flow of the management server 10 at the time of reservation. "A1" in FIG. 14 is connected to "A1" in FIG. 15. "A2" in FIG. 15 is connected to "A2" in FIG. 16.

The control unit 110 of the management server 10 executes a computer program that is stored in the storage unit 130, for example, when the power source is turned on. By the execution of the computer program, each function unit of the control unit 110 is realized. When the user ID and the password are input from the portable terminal 30, the behavior flows in FIG. 14 and the like are started by the behavior of the reservation management unit 111 of the management server 10.

The reservation management unit 111 of the management server 10 receives the user ID and password (FIG. 13: S102) sent by the portable terminal 30, through the communication processing unit 120. The reservation management unit 111 performs retrieval in the user information DB 131 of the storage unit 130, using the received user ID as a retrieval key (S201).

In the case where the received user ID is not in the user information DB 131, there is no registration of the user corresponding to the user ID (S202; NO), and the process proceeds to step S203. Further, in the case where the received user ID is in the user information DB 131 and where the received password is different from a password that is stored in the user information DB 131 and that corresponds to the user ID, the process proceeds to step S203, similarly to the case of no registration (S202; NO). In step S203, the reservation management unit 111 determines that the received user ID and password are not authenticated (the authentication is NG). The reservation management unit 111 sends an authentication result indicating that the received user ID and password are not authenticated (the authentication is NG), to the portable terminal 30 (S204), and the process ends.

On the other hand, in the case where the received user ID is in the user information DB 131 and where the received password coincides with the password that is stored in the user information DB 131 and that corresponds to the user ID, there is a registration of the user corresponding to the user ID (S202; YES), and the process proceeds to step S205. In step S205, the reservation management unit 111 determines that the received user ID and password are authenticated (the authentication is OK). The reservation management unit 111 sends an authentication result indicating that the received user ID and password are authenticated (the authentication is OK), to the portable terminal 30 (S206).

The reservation management unit 111 extracts the reservation status information from the reservation information DB (S207). The reservation status information includes a car (vehicle type) that can be currently reserved for use in the information processing system 1, an available period, a rental place, a return place and the like. The reservation management unit 111 sends the extracted reservation status information to the portable terminal 30 through the communication processing unit 120 (S208).

The reservation management unit 111 waits until the reservation management unit 111 receives the reservation condition from the portable terminal 30 (FIG. 15: S209; NO). In the case where the reservation management unit 111 has not received the reservation condition from the portable terminal 30 even after a lapse of a predetermined time, the reservation management unit 111 may end the process.

The reservation management unit 111 receives the reservation condition (FIG. 13: S107) sent by the portable terminal 30, through the communication processing unit 120 (S209; YES).

Next, the use frequency determination unit 112 determines the use frequency of the user for the car (vehicle type) reserved by the user corresponding to the user ID. The use frequency determination unit 112 performs retrieval in the use history information DB 133, using the user ID as a retrieval key (S210). The use frequency determination unit 112 acquires the car use history of the user corresponding to the user ID. The use frequency determination unit 112 performs retrieval in the user information DB 131, using the user ID as a retrieval key, and acquires the vehicle type of the private car of the user corresponding to the user ID (and whether the user owns a private car).

The use frequency determination unit 112 checks whether the user owns a private car (S211). In the case where the user owns a private car (S211; YES), the use frequency determination unit 112 checks whether the vehicle type of the car reserved by the user is the same as the vehicle type of the private car of the user (S212). In the case where the use frequency determination unit 112 determines that the vehicle type of the car reserved by the user is the same as the vehicle type of the private car of the user (S212; YES), the process proceeds to step S214.

In the case where the user owns no private car (S211; NO), or in the case where the vehicle type of the car reserved by the user is not the same as the vehicle type of the private car of the user (S212; NO), the use frequency determination unit 112 determines whether the number of uses by the user of the vehicle type of the car reserved by the user is less than a predetermined number (n times), based on the car use frequency of the user (S213). In the case where the number of uses by the user is less than the predetermined number (n times) (S213; YES), the process proceeds to step S215. In the case where the number of uses by the user is equal to or more than the predetermined number (n times) (S213; NO), the process proceeds to step S214. The use frequency determination unit 112 may determine whether the number of uses after the current time before a predetermined period exceeds a predetermined number, as a determined standard. In the case where the use of the vehicle type of the car reserved by the user is a periodical use based on the car use history of the user, the use frequency determination unit 112 may regard this case as being the same as the case where the number of uses by the user is equal to or more than the predetermined number (n times).

In step S214, the use frequency determination unit 112 determines that the vehicle type reserved by the user is a vehicle type for which the use frequency of the user is high. On the other hand, in step S215, the use frequency determination unit 112 determines that the vehicle type reserved by the user is a vehicle type for which the use frequency of the user is low. These determination results are stored in the storage unit 130.

The vehicle type-classified function difference extraction unit 113 checks whether the vehicle type reserved by the user is a vehicle type for which the use frequency of the user is high (FIG. 16: S216). In the case where the vehicle type reserved by the user is a vehicle type for which the use frequency of the user is high (S216; YES), the process proceeds to step S221. In the case where the vehicle type reserved by the user is a vehicle type for which the use frequency of the user is low (S216; NO), the process proceeds to step S217.

The vehicle type-classified function difference extraction unit 113 checks whether the user owns a private car (S217). In the case where the user owns a private car (S217; YES), the vehicle type-classified function difference extraction unit 113 extracts the function and function operation method of the vehicle type of the private car of the user and the function and function operation method of the vehicle type of the car reserved by the user, from the vehicle type-classified operation method DB 134. From the extracted functions and function operation methods, the vehicle type-classified function difference extraction unit 113 extracts a function and function operation methods for which the function is the same and the operation method is different between the vehicle type of the private car of the user and the vehicle type of the car reserved by the user (S218).

In the case where the user owns no private car (S217; NO), the vehicle type-classified function difference extraction unit 113 extracts a vehicle type for which the use frequency is highest, from the vehicle types of the cars used by the user, based on the car use history of the user (S219), and the process proceeds to step S222.

The vehicle type-classified function difference extraction unit 113 extracts the function and function operation method of the vehicle type extracted in step S219 and the function and function operation method of the vehicle type of the car reserved by the user, from the vehicle type-classified operation method DB 134. From the extracted functions and function operation methods, the vehicle type-classified function difference extraction unit 113 extracts a function and function operation methods for which the function is the same and the operation method is different between the vehicle type extracted in step S219 and the vehicle type of the car reserved by the user (S220), and the process proceeds to step S222.

In step S221, the reservation management unit 111 registers the reservation condition received in step S209, in the reservation information DB 132, as the reservation information. The reservation information to be registered includes information about the rental date and hour, the rental place, the return date and hour, the return place and the used vehicle type.

In step S222, the reservation management unit 111 registers the reservation condition received in step S209, in the reservation information DB 132, as the reservation information. The reservation information to be registered includes the information about the rental date and hour, the rental place, the return date and hour, the return place and the used vehicle type, the information about the vehicle type of the car for which the use frequency of the user is high (or the vehicle type of the car owned by the user), and the information extracted in step S218 or step S220. The reservation information may include the determination result (the vehicle type for which the use frequency is high or the vehicle type for which the use frequency is low) in step S214 or step S215.

In step S221 or step S222, the use reservation for the car by the user is fixed.

The reservation management unit 111 sends the reservation completion notice including the reservation information stored in the reservation information DB 132 in step S221 or step S222, to the portable terminal 30 (S223).

By the behavior flows in FIG. 14, FIG. 15 and FIG. 16, the management server 10 can register the use reservation by the user for the vehicle 20. The management server 10 determines whether the use frequency for the vehicle type of the vehicle 20 reserved by the user is high, based on the use history of the user. The management server 10 extracts the function for which the operation method is different between the vehicle type of the car for which the use frequency of the user is high and the vehicle type of the reserved car. The management server 10 sends the extracted function and the operation methods for the function, to the portable terminal 30.

Next, an operation assist behavior when the operation method for the operation unit is different between the vehicles before and after the switching will be described with use of FIG. 17.

Figure 17:
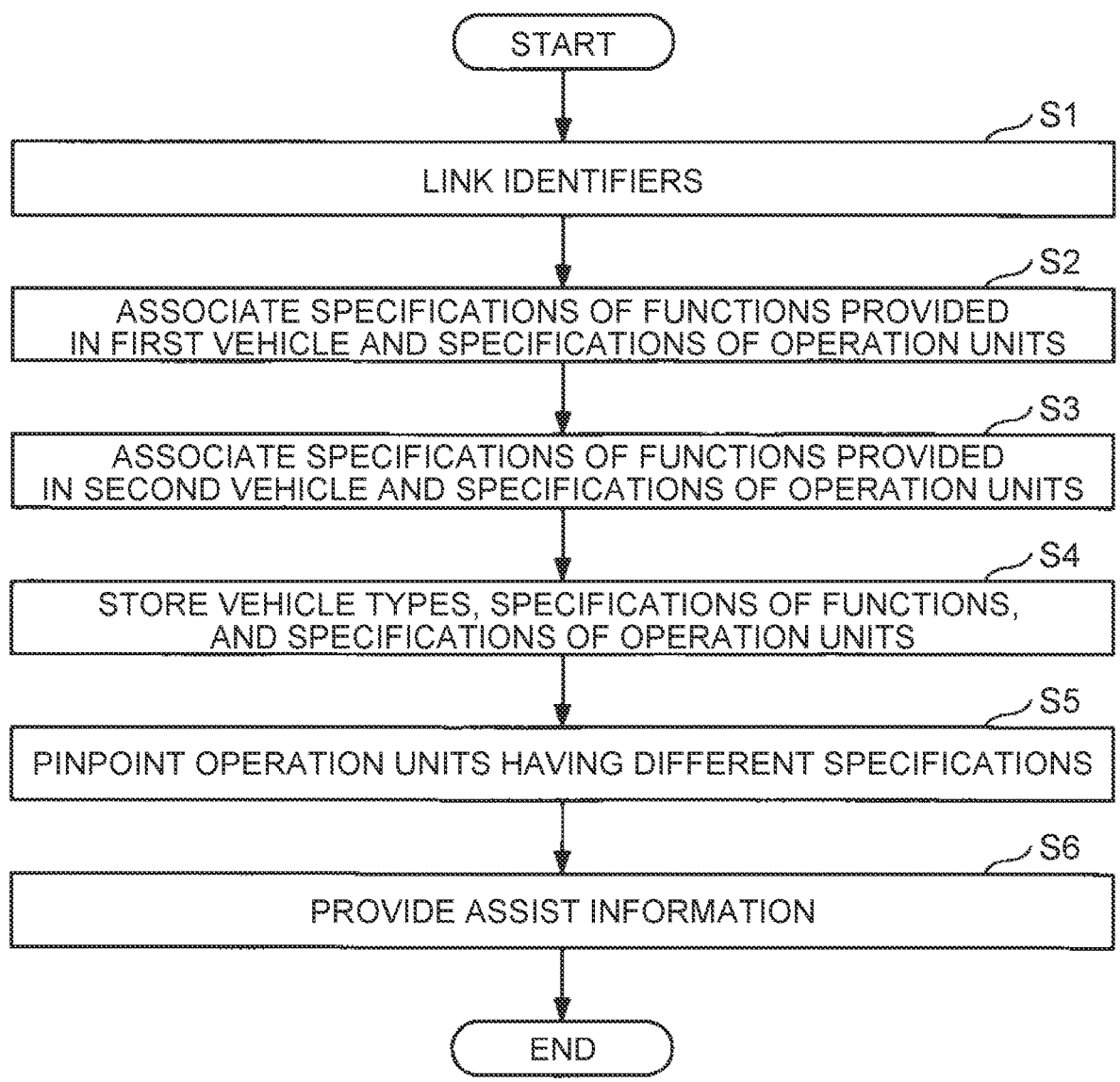
FIG. 17 is a flowchart for describing an operation assist behavior.

FIG. 17 is a flowchart for describing the operation assist behavior. In step S1, the identifier management unit 114 refers to the user information DB 131 and the reservation information DB 132, and manages the first identifier, the second identifier and the third identifier, such that the first identifier, the second identifier and the third identifier are linked with each other. For example, when the reservation for the vehicle 20 is performed, the name of the user, the vehicle type of the private car, and the like are registered in the user information DB 131, and the vehicle type of the vehicle 20, the name and mail address of the user having reserved the vehicle 20, and the like are registered in the reservation information DB 132. Therefore, by referring to the user information DB 131 and the reservation information DB 132, the identifier management unit 114 can manage the first identifier by which the vehicle type of the private car is identified, the second identifier by which the vehicle type of the reserved car is identified, and the third identifier by which the user is identified, such that the first identifier, the second identifier and the third identifier are linked with each other.

In step S2, the specification management unit 115 associates the specifications of a plurality of functions (for example, "FUNCTION 1" to "FUNCTION 4") provided in the vehicle of the Heisei 25 model year vehicle type α and the specifications of the operation units for operating the functions, based on the third identifier of the user that is managed in the identifier management unit 114 and the first identifier (for example, the identification information for uniquely identifying the Heisei 25 model year vehicle type α) of the first vehicle.

In step S3, the specification management unit 115 associates the specifications of a plurality of functions (for example, "FUNCTION 1" to "FUNCTION 4") provided in the vehicle of the Heisei 27 model year vehicle type α and the specifications of the operation units for operating the functions, based on the third identifier of the user that is managed in the identifier management unit 114 and the second identifier (for example, the identification information for uniquely identifying the Heisei 27 model year vehicle type α) of the second vehicle.

In step S4, the specification management unit 115 stores the vehicle types, the specifications of the functions and the specifications of the operation units, which are associated in this way, in the vehicle type-classified operation method DB 134, as the specification information.

In step S5, the specification difference pinpointing unit 116 refers to the specification information that is managed by the specification management unit 115, and the information about the first identifier, the second identifier and the third identifier that are linked with each other by the identifier management unit 114. Then, the specification difference pinpointing unit 116 compares the specification (the specification of the operation unit of the vehicle before the switching; TURNING OF DIAL SWITCH) of the first operation unit corresponding to the first function (for example, the specification of "FUNCTION 1" of the vehicle before the switching) and the specification (the specification of the operation unit of the vehicle after the switching; PINCH OPERATION OF TOUCH PANEL) of the second operation unit corresponding to the second function (for example, the specification of "FUNCTION 1" of the vehicle after the switching).

Thereby, the specification difference pinpointing unit 116 pinpoints two operation units for which the specification of the function is common (the same) and the specification of the operation unit is different before and after the switching. The specification difference pinpointing unit 116 may be configured to pinpoint a function for which the specification of the operation unit is common (the same) and the specification of the function is different before and after the switching, as a result of the comparison. This configuration example will be described later.

In step S6, based on the information relevant to the operation units that have the different specifications and that are pinpointed by the specification difference pinpointing unit 116, the assist information providing unit 117 sends the assist information for assisting the operation of the operation unit, to the in-vehicle apparatus 200 and the portable terminal 30, and thereby provides the assist information to the user. Then, the operation assist behavior ends.

As a method for providing the assist information, the assist information providing unit 117 may read the guidance information stored in the guidance information DB 135 and may cause the in-vehicle apparatus 200 and the portable terminal 30 to play back the guidance information, or may read information distributed from a device in the exterior of the management server 10 and may cause the in-vehicle apparatus 200 and the portable terminal 30 to play back the information.

Modification

In some cases, the specification of the operation unit is common (the same), but the specification of the function that is set or altered by the common operation unit is different before and after the switching. For example, a plurality of functions (the adjustment of the scale of the map, the alteration of traveling mode, the adjustment of the sound volume of the voice guidance, and the like) that can be set with a particular operation unit (for example, a dial switch on a center panel) is provided in the vehicle before the switching, while some functions of the plurality of functions are removed in the vehicle of the same vehicle type after the switching. Further, in some cases, a function that is not provided in the vehicle before the switching is added in the vehicle after the switching.

In view of such cases, the specification difference pinpointing unit 116 may be configured to compare the specification of the first function and the specification of the second function, and to pinpoint a function for which the specification of the operation unit is common (the same) and the specification of the function is different before and after the switching, as a result of the comparison. The common (the same) specification means coincidence of basic specifications of the operation units at an extent allowing the user to recognize that the specifications are common, and trivial differences are acceptable. For example, the trivial difference means that the operation units coincide as a whole but the operation units partially differ. Further, for example, the trivial difference means that the shapes and arrangement positions of the operation units coincide as a whole but the shapes and arrangement positions of the operation units partially differ.

The assist information providing unit 117 may be configured to provide assist information for assisting the operation of the function that has a different specification and that is pinpointed by the specification difference pinpointing unit 116, based on information relevant to the function. The vehicle type-classified operation method DB 134, the specification difference information DB 136, the guidance information DB 135 and the like that are used by the thus configured specification difference pinpointing unit 116 and the thus configured assist information providing unit 117 will be described below, with use of FIG. 18A to FIG. 18D.

FIG. 18A is a diagram showing a modification of the vehicle type-classified operation method DB 134. The vehicle type-classified operation method DB 134 shown in FIG. 18A is different from the vehicle type-classified operation method DB 134 shown in FIG. 6A, for example, in that a function to alter the traveling mode of the vehicle is added as "FUNCTION 5" in the Heisei 27 model year vehicle. The traveling mode is an exemplary traveling control method for the vehicle 20, and is classified into "fuel efficiency priority mode", "comfort priority mode", "50-50 mode" and "charging mode", for example. The "fuel efficiency priority mode" is a control method in which priority is given to fuel efficiency. The "comfort priority mode" is a control method in which priority is given to comfort for the occupant. The "50-50 mode" is an intermediate control method between the "fuel efficiency priority mode" and the "comfort priority mode". The "charging mode" is a control method in which priority is given to charging of the battery.

In this case, for example, the Heisei 25 model year vehicle has no function to alter the traveling mode, and therefore, there is no corresponding operation method. In the Heisei 27 model year vehicle, it is possible to alter setting of "FUNCTION 5" by turning of a dial switch (operation method X1).

Figure 18B:
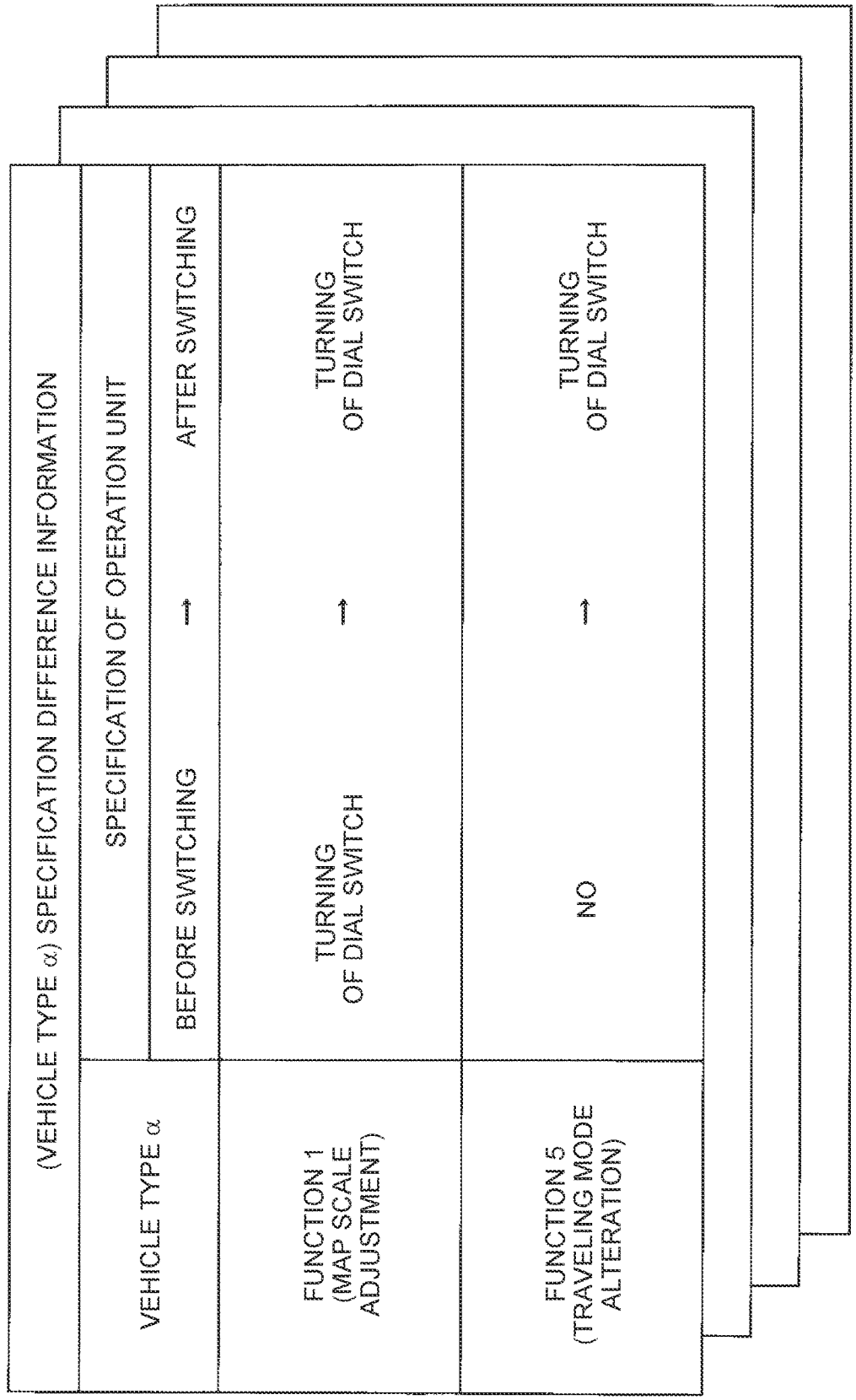
FIG. 18B is a diagram showing a modification of the specification difference information DB 136.

FIG. 18B is a diagram showing a modification of the specification difference information DB 136. The specification difference information DB 136 shown in FIG. 18B is different from the specification difference information DB 136 shown in FIG. 6B, in that information relevant to an operation method for "FUNCTION 5" is added instead of the information relevant to the operation method for "FUNCTION 4". Further, in each of "FUNCTION 1" and "FUNCTION 5", the specification of the operation unit after the switching is turning of the dial switch.

Figure 18C:
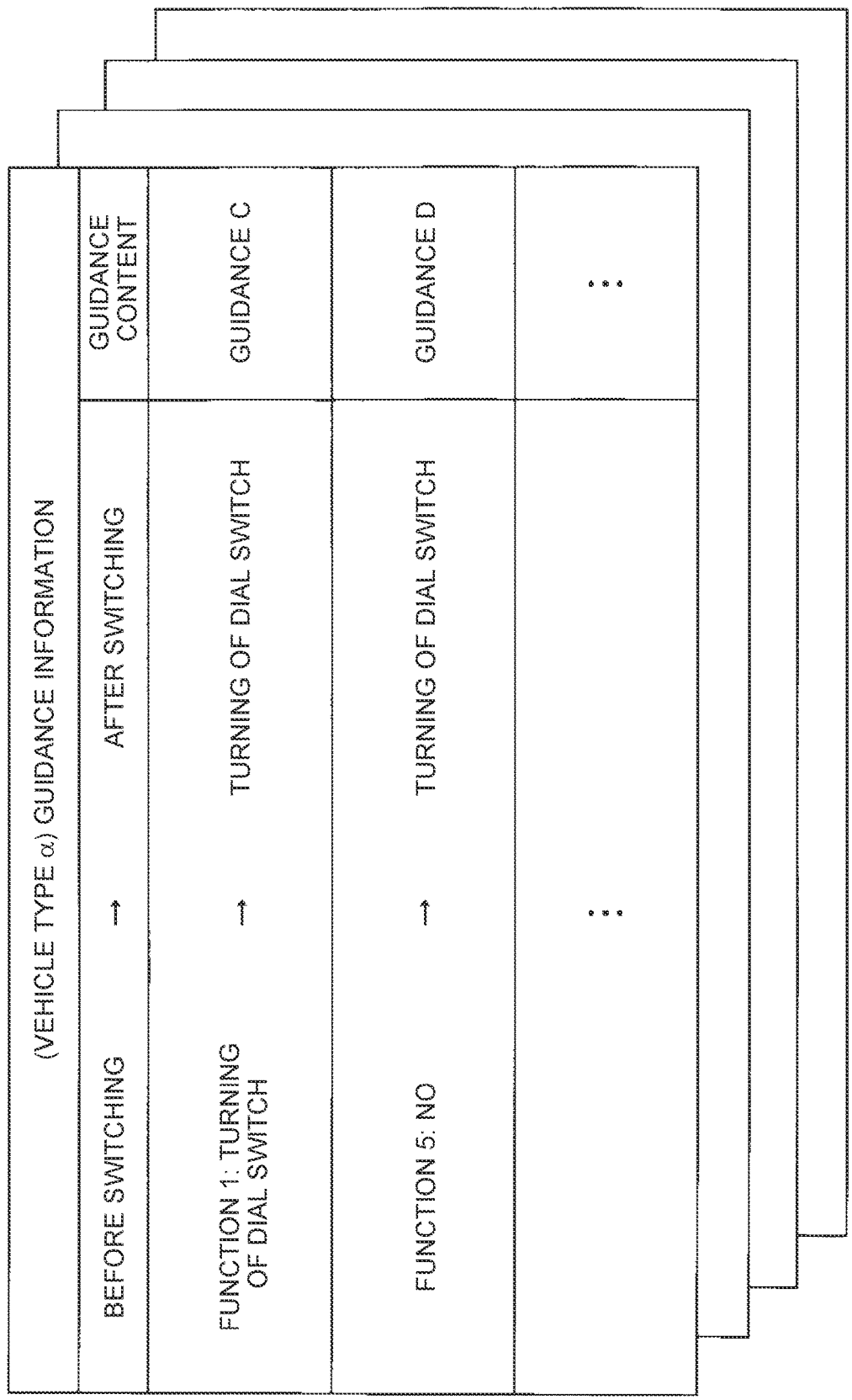
FIG. 18C is a diagram showing a modification of the guidance information DB 135.

FIG. 18C is a diagram showing a modification of the guidance information DB 135. The guidance information DB 135 shown in FIG. 18C is different from the guidance information DB 135 shown in FIG. 6C, in that the specification of the operation unit corresponding to "FUNCTION 1" after the switching is the same as the specification of the operation unit corresponding to "FUNCTION 1" before the switching, and further the information of "GUIDANCE C" is associated. Further, the guidance information DB 135 shown in FIG. 18C is different from the guidance information DB 135 shown in FIG. 6C, in that there is no specification of the operation unit corresponding to "FUNCTION 5" before the switching, the specification of the operation unit corresponding to "FUNCTION 5" after the switching is added, and further the information of "GUIDANCE D" is associated.

Figures 18D, 19:
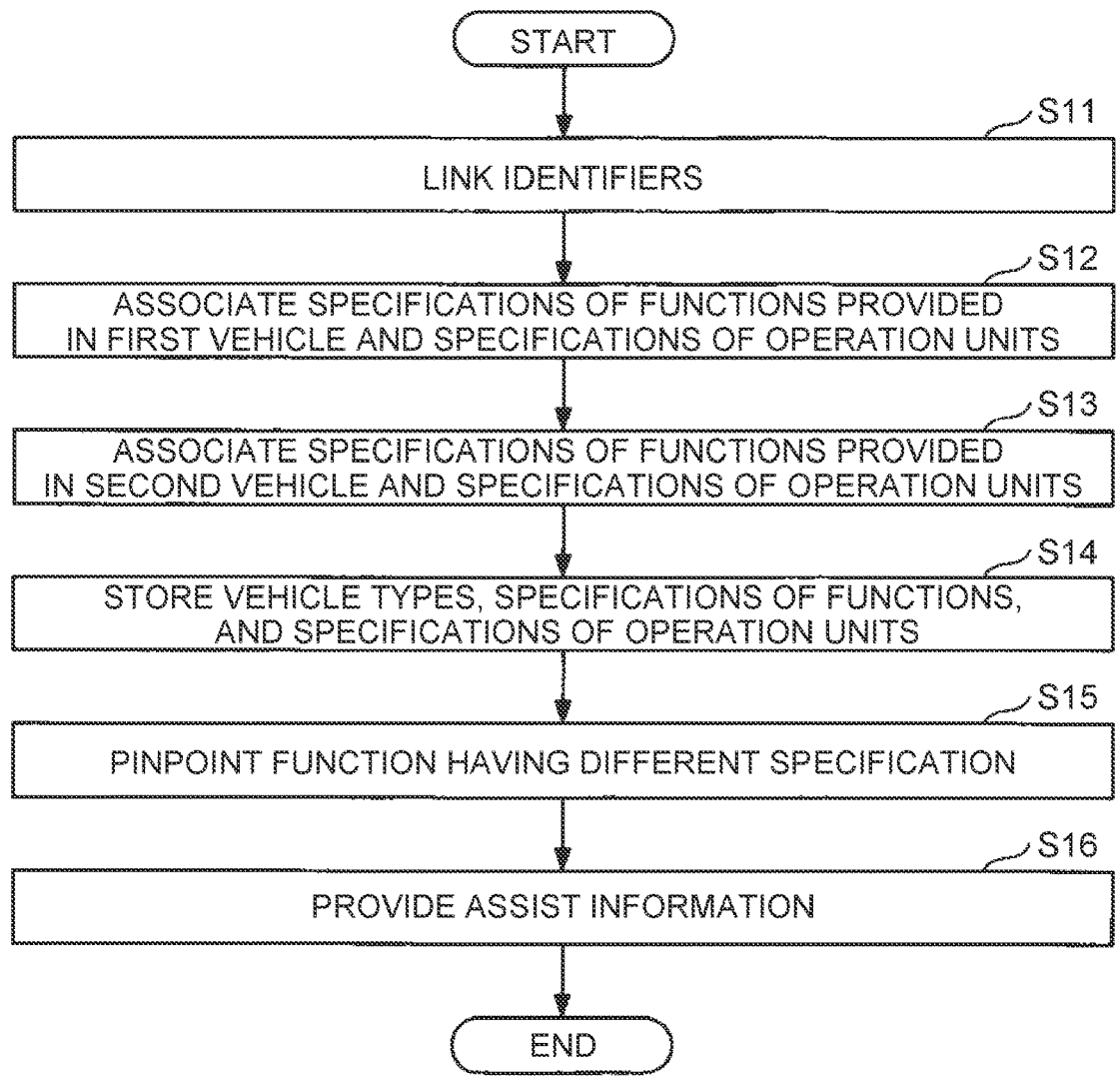
FIG. 18D is a diagram for describing a specific example of guidance information shown in FIG. 18C.
FIG. 19 is a flowchart for describing an operation assist behavior of an information processing system 1 according to a modification.

FIG. 18D is a diagram for describing a specific example of the guidance information shown in FIG. 18C. As shown in FIG. 18D, for example, the guidance C has a content "USE DIAL SWITCH TO PERFORM METHOD FOR ADJUSTING SCALE OF MAP, SIMILARLY TO CAR BEFORE SWITCHING". For example, the guidance D has a content "NEW FUNCTION TO BE SET WITH DIAL SWITCH IS ADDED. TRAVELING MODE CAN BE ALTERED USING DIAL SWITCH".

The guidance C and the guidance D are not limited to the above contents, and only need to be information for assisting the user such that the user can set or operate the function (the added or altered function) for which the specification is different before and after the switching, without trouble.

The guidance C and the guidance D may be displayed on the screen of the portable terminal 30 or the in-vehicle apparatus 200, or may be emitted from the speaker of the portable terminal 30 or the in-vehicle apparatus 200. In this case, the assist information providing unit 117 reads the information recorded in the guidance information DB 135, and sends the read information to the portable terminal 30 or the in-vehicle apparatus 200 through the communication processing unit 120. Based on the sent information, the portable terminal 30 or the in-vehicle apparatus 200 plays back the guidance with a text or the guidance with a voice, in accordance with the guidance information, and thereby can assist the operation by the user.

Next, an operation assist behavior when the operation method for the operation unit is different between the vehicles before and after the switching in the information processing system 1 according to the modification will be described with use of FIG. 19.

FIG. 19 is a flowchart for describing the operation assist behavior in the information processing system 1 according to the modification. Processes from step S11 to step S14 are the same as the processes from step S1 to step S4 shown in FIG. 17, and therefore the description for the processes is omitted.

In step S15, the specification difference pinpointing unit 116 refers to the specification information that is managed by the specification management unit 115, and the information about the first identifier, the second identifier and the third identifier that are linked with each other by the identifier management unit 114. Then, the specification difference pinpointing unit 116 compares the specification (the specification of the operation unit of the vehicle before the switching; TURNING OF DIAL SWITCH) of the first operation unit corresponding to the first function (for example, the specification of "FUNCTION 1" of the vehicle before the switching) and the specification (the specification of the operation unit of the vehicle after the switching; TURNING OF DIAL SWITCH) of the second operation unit corresponding to the second function (for example, the specification of "FUNCTION 1" of the vehicle after the switching).

Thereby, the specification difference pinpointing unit 116 determines that the specification of the function is common (the same) and the function of the operation unit is common (the same) before and after the switching.

Further, the specification difference pinpointing unit 116 compares the specification (the specification of the operation unit of the vehicle before the switching; NO) of the first operation unit corresponding to the first function (for example, the specification of "FUNCTION 5" of the vehicle before the switching) and the specification (the specification of the operation unit of the vehicle after the switching; TURNING OF DIAL SWITCH) of the second operation unit corresponding to the second function (for example, the specification of "FUNCTION 5" of the vehicle after the switching).

Thereby, the specification difference pinpointing unit 116 pinpoints the function ("FUNCTION 5" added in the vehicle after the switching) for which the specification of the operation unit is common (the same) and the specification of the function is different before and after the switching.

In step S16, based on the information relevant to the function that has the different specification and that is pinpointed by the specification difference pinpointing unit 116, the assist information providing unit 117 sends the assist information for assisting the operation of the operation unit, to the in-vehicle apparatus 200 and the portable terminal 30, and thereby provides the assist information to the user. Then, the operation assist behavior ends.

In this case, as a method for providing the assist information, the assist information providing unit 117 may read the guidance information stored in the guidance information DB 135 and may cause the in-vehicle apparatus 200 and the portable terminal 30 to play back the guidance information, or may read information distributed from a device in the exterior of the management server 10 and may cause the in-vehicle apparatus 200 and the portable terminal 30 to play back the information.

The guidance C and the guidance D may be displayed on the screen of the portable terminal 30 or the in-vehicle apparatus 200, or may be emitted from the speaker of the portable terminal 30 or the in-vehicle apparatus 200. In this case, the assist information providing unit 117 reads the information recorded in the guidance information DB 135, and sends the read information to the portable terminal 30 or the in-vehicle apparatus 200 through the communication processing unit 120. Thereby, the playback of the guidance C and the guidance D is executed by the portable terminal 30 or the in-vehicle apparatus 200. Based on the sent information, the portable terminal 30 or the in-vehicle apparatus 200 plays back the guidance with a text or the guidance with a voice, in accordance with the guidance information, and thereby can assist the operation by the user.

In the information processing system 1 according to the modification, the timing when the guidance C and the guidance D are played back by the portable terminal 30 or the in-vehicle apparatus 200 may be a timing right after the start switch is pushed for turning on the accessory power source of the vehicle, or may be a timing when a particular operation unit is operated.

Further, in the information processing system 1 according to the modification, the timing when the guidance C and the guidance D are played back by the portable terminal 30 may be, for example, a timing when a predetermined acceleration is detected in the portable terminal 30. Specifically, when the user of the portable terminal 30 pushes the start switch for turning on the accessory power source and thereafter shakes the portable terminal 30 such that a certain or higher acceleration is generated, the action detection signal indicating that the user has shaken the portable terminal 30 is input to the in-vehicle apparatus 200. Then, the in-vehicle apparatus 200 sends the guidance distribution request to the management server 10. The assist information providing unit 117, after receiving the distribution request, refers to the guidance information DB 135, and sends the corresponding guidance information to the portable terminal 30.

By using the acceleration that is detected in the portable terminal 30 in this way, it is possible to play back the guidance only when the assist relevant to setting or alteration of a desired function is necessary. Therefore, in the case where the user determines that the assist relevant to the setting or alteration of the desired function is unnecessary, the unnecessary information (guidance) is not played back, so that the user can focus on driving without having an uncomfortable feeling.

As described above, the information processing system according to the embodiment includes an identifier management unit that manages a first identifier, a second identifier and a third identifier, the first identifier being an identifier by which a first vehicle is uniquely identified, the first vehicle including a first operation unit with which a first function related to vehicle driving is operated, the second identifier being an identifier by which a second vehicle is uniquely identified, the second vehicle including a second operation unit with which a second function related to the vehicle driving is operated, the third identifier being an identifier by which a user is uniquely identified, the user switching from the first vehicle to the second vehicle. The information processing system includes a specification management unit that manages specification information indicating each specification of the first function, the second function, the first operation unit and the second operation unit. The information processing system includes a specification difference pinpointing unit that compares the specification of the first operation unit and the specification of the second operation unit, based on the specification information, the first identifier, the second identifier and the third identifier, and that pinpoints an operation unit for which a specification of a function is common and a specification of the operation unit is different before and after the switching from the first vehicle to the second vehicle. The information processing system includes an assist information providing unit that provides assist information based on information relevant to the pinpointed operation unit having the different specification, the assist information being information by which an operation of the pinpointed operation unit is assisted.

With this configuration, a user that buys the same vehicle type as a replacement, or a user that uses the same vehicle type by using a car sharing service can refer to the assist information provided from the assist information providing unit, in the vehicle after the switching, and thereby can focus on the driving of the vehicle while a long time is not required before the user is accustomed to the operation unit.

The specification difference pinpointing unit in the information processing system according to the embodiment may be configured to pinpoint a function for which a specification of an operation unit is common and a specification of the function is different before and after the switching from the first vehicle to the second vehicle, by comparing the specification of the first function and the specification of the second function instead of the specification of the first operation unit and the specification of the second operation unit. Further, the assist information providing unit in the information processing system according to the embodiment may be configured to provide assist information based on information relevant to the pinpointed function having the different specification instead of the information relevant to the pinpointed operation unit having the different specification, the assist information being information by which an operation of the pinpointed function is assisted.

With this configuration, even in the case of alteration of a function that can be operated with a particular operation unit equipped in the vehicles before and after the switching, the user can use a desired function without having a feeling of strangeness, by referring to the assist information provided from the assist information providing unit.

An information processing program according to the embodiment causes a computer to execute: a step of managing a first identifier, a second identifier and a third identifier, the first identifier being an identifier by which a first vehicle is uniquely identified, the first vehicle including a first operation unit with which a first function related to vehicle driving is operated, the second identifier being an identifier by which a second vehicle is uniquely identified, the second vehicle including a second operation unit with which a second function related to the vehicle driving is operated, the third identifier being an identifier by which a user is uniquely identified, the user switching from the first vehicle to the second vehicle; a step of managing specification information indicating each specification of the first function, the second function, the first operation unit and the second operation unit; a step of comparing the specification of the first operation unit and the specification of the second operation unit, based on the specification information, the first identifier, the second identifier and the third identifier, and pinpointing an operation unit for which a specification of a function is common and a specification of the operation unit is different before and after the switching from the first vehicle to the second vehicle; and a step of providing assist information based on information relevant to the pinpointed operation unit having the different specification, the assist information being information by which an operation of the pinpointed operation unit is assisted.

Further, an information processing program according to the embodiment causes a computer to execute: a step of managing a first identifier, a second identifier and a third identifier, the first identifier being an identifier by which a first vehicle is uniquely identified, the first vehicle including a first operation unit with which a first function related to vehicle driving is operated, the second identifier being an identifier by which a second vehicle is uniquely identified, the second vehicle including a second operation unit with which a second function related to the vehicle driving is operated, the third identifier being an identifier by which a user is uniquely identified, the user switching from the first vehicle to the second vehicle; a step of managing specification information indicating each specification of the first function, the second function, the first operation unit and the second operation unit; a step of comparing the specification of the first function and the specification of the second function, based on the specification information, the first identifier, the second identifier and the third identifier, and pinpointing a function for which a specification of an operation unit is common and a specification of the function is different before and after the switching from the first vehicle to the second vehicle; and a step of providing assist information based on information relevant to the pinpointed function having the different specification, the assist information being information by which an operation of the pinpointed function is assisted.

The configuration shown in the embodiment is an example of the content of the disclosure, and can be combined with another known technology. A part of the configuration can be excluded or modified without departing from the spirit of the disclosure.

What is claimed is:

1. An information processing system comprising:
   a processor programed to
   manage a first identifier, a second identifier and a third identifier, the first identifier being an identifier by which a first vehicle is uniquely identified, the first vehicle including a first device with which a first function related to vehicle driving is operated, the second identifier being an identifier by which a second vehicle is uniquely identified, the second vehicle including a second device with which a second function related to the vehicle driving is operated, the third identifier being an identifier by which a user is uniquely identified, the user switching from the first vehicle to the second vehicle;
   manage specification information indicating a specification of each of the first function, the second function, the first device and the second device;
   compare the specification of the first device and the specification of the second device, based on the specification information, the first identifier, the second identifier and the third identifier, and pinpoint the second device for which the specification of the second function is common with the specification of the first function and the specification of the second device is different from the specification of the first device before and after the switching from the first vehicle to the second vehicle; and
   provide assist information based on information relevant to the pinpointed device having the different specification of the device, the assist information being information by which an operation of the pinpointed device is assisted, wherein
   the processor provides the assist information by which the operation of the device is assisted, to a portable terminal of the user that switches from the first vehicle to the second vehicle, only when a certain or higher acceleration is detected in the portable terminal.

2. The information processing system according to claim 1, wherein:
   the processor pinpoints a function for which a specification of a device is common and a specification of the function is different before and after the switching from the first vehicle to the second vehicle, by comparing the specification of the first function and the specification of the second function instead of the specification of the first device and the specification of the second device; and
   the processor provides assist information based on information relevant to the pinpointed function having the different specification instead of the information relevant to the pinpointed device having the different specification, the assist information being information by which an operation of the pinpointed function is assisted.

3. A non-transitory computer readable medium including an information processing program that causes a computer to execute:
   a step of managing a first identifier, a second identifier and a third identifier, the first identifier being an identifier by which a first vehicle is uniquely identified, the first vehicle including a first device with which a first function related to vehicle driving is operated, the second identifier being an identifier by which a second vehicle is uniquely identified, the second vehicle including a second device with which a second function related to the vehicle driving is operated, the third identifier being an identifier by which a user is uniquely identified, the user switching from the first vehicle to the second vehicle;
   a step of managing specification information indicating a specification of each of the first function, the second function, the first device and the second device;
   a step of comparing the specification of the first device and the specification of the second device, based on the specification information, the first identifier, the second identifier and the third identifier, and pinpointing the second device for which the specification of the second function is common with the specification of the first function and the specification of the second device is different from the specification of the first device before and after the switching from the first vehicle to the second vehicle; and
   a step of providing assist information based on information relevant to the pinpointed device having the different specification of the device, the assist information being information by which an operation of the pinpointed device is assisted, wherein
   the step of providing the assist information provides the assist information by which the operation of the device is assisted, to a portable terminal of the user that switches from the first vehicle to the second vehicle, only when a certain or higher acceleration is detected in the portable terminal.

4. A non-transitory computer readable medium including an information processing program that causes a computer to execute:
   a step of managing a first identifier, a second identifier and a third identifier, the first identifier being an identifier by which a first vehicle is uniquely identified, the first vehicle including a first device with which a first function related to vehicle driving is operated, the second identifier being an identifier by which a second vehicle is uniquely identified, the second vehicle including a second device with which a second function related to the vehicle driving is operated, the third identifier being an identifier by which a user is uniquely identified, the user switching from the first vehicle to the second vehicle;
   a step of managing specification information indicating a specification of each of the first function, the second function, the first device and the second device;

a step of comparing the specification of the first function and the specification of the second function, based on the specification information, the first identifier, the second identifier and the third identifier, and pinpointing the second function for which the specification of the second device is common with the specification of the first device and the specification of the second function is different from the specification of the first function before and after the switching from the first vehicle to the second vehicle; and a step of providing assist information based on information relevant to the pinpointed function having the different specification of the function, the assist information being information by which an operation of the pinpointed function is assisted, wherein the step of providing the assist information provides the assist information by which the operation of the pinpointed function is assisted, to a portable terminal of the user that switches from the first vehicle to the second vehicle, only when a certain or higher acceleration is detected in the portable terminal.

5. The information processing system according to claim 1, wherein:
the processor is further programed to
determine whether a use frequency of a vehicle type of the second vehicle is less than a threshold based on a use history of the user, and
in response to determining that the use frequency is less than the threshold,
extract a function for which an operation method of the vehicle type of the second vehicle is different from an operation method of a vehicle type of the first vehicle, and
send the extracted function and the operation methods of the extracted function to the portable terminal.

6. The non-transitory computer readable medium according to claim 3, wherein the information processing program further causes the computer to execute
a step of determining whether a use frequency of a vehicle type of the second vehicle is less than a threshold based on a use history of the user, and
in response to determining that the use frequency is less than the threshold,
a step of extracting a function for which an operation method of the vehicle type of the second vehicle is different from an operation method of a vehicle type of the first vehicle, and
a step of sending the extracted function and the operation methods of the extracted function to the portable terminal.

7. The non-transitory computer readable medium according to claim 4, wherein the information processing program further causes the computer to execute
a step of determining whether a use frequency of a vehicle type of the second vehicle is less than a threshold based on a use history of the user, and
in response to determining that the use frequency is less than the threshold,
a step of extracting a function for which an operation method of the vehicle type of the second vehicle is different from an operation method of a vehicle type of the first vehicle, and
a step of sending the extracted function and the operation methods of the extracted function to the portable terminal.

* * * * *